US012561172B2

(12) United States Patent
Kim et al.

(10) Patent No.: US 12,561,172 B2
(45) Date of Patent: Feb. 24, 2026

(54) METHOD OF SCHEDULING CACHE BUDGET IN MULTI-CORE PROCESSING DEVICE AND MULTI-CORE PROCESSING DEVICE PERFORMING THE SAME

(71) Applicant: SAMSUNG ELECTRONICS CO., LTD., Suwon-si (KR)

(72) Inventors: Sangkyu Kim, Suwon-si (KR); Jonglae Park, Anyang-si (KR); Yeonghwan Son, Seoul (KR); Dahye Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 756 days.

(21) Appl. No.: 17/888,162

(22) Filed: Aug. 15, 2022

(65) Prior Publication Data

US 2023/0214271 A1     Jul. 6, 2023

(30) Foreign Application Priority Data

Dec. 30, 2021     (KR) ........................ 10-2021-0192203

(51) Int. Cl.
*G06F 9/50*          (2006.01)
*G06F 12/0871*     (2016.01)

(52) U.S. Cl.
CPC .......... *G06F 9/5038* (2013.01); *G06F 9/5016* (2013.01); *G06F 9/505* (2013.01); *G06F 12/0871* (2013.01); *G06F 2212/502* (2013.01); *G06F 2212/6042* (2013.01)

(58) Field of Classification Search
None
See application file for complete search history.

(56) References Cited

U.S. PATENT DOCUMENTS

| | | | | |
|---|---|---|---|---|
| 5,875,464 A | * | 2/1999 | Kirk ................... | G06F 12/0842 711/E12.039 |
| 8,417,889 B2 | | 4/2013 | Flemming et al. | |
| 9,032,156 B2 | | 5/2015 | Chung et al. | |
| 9,477,601 B2 | | 10/2016 | Zhang et al. | |
| 10,452,554 B2 | | 10/2019 | Amer et al. | |
| 2003/0014595 A1 | | 1/2003 | Doteguchi et al. | |
| 2006/0143390 A1 | * | 6/2006 | Kottapalli ............. | G06F 12/126 711/E12.075 |
| 2011/0113215 A1 | | 5/2011 | Thomas et al. | |
| 2021/0055967 A1 | | 2/2021 | Jeon et al. | |

FOREIGN PATENT DOCUMENTS

| | | |
|---|---|---|
| KR | 10-1232561 B1 | 2/2013 |
| KR | 10-1973157 B1 | 4/2019 |
| KR | 10-2275181 B1 | 7/2021 |

* cited by examiner

*Primary Examiner* — Qing Yuan Wu
(74) *Attorney, Agent, or Firm* — Sughrue Mion, PLLC

(57) ABSTRACT

A method is provided. The method includes: receiving a plurality of characteristic information associated with a plurality of tasks allocated to a plurality of processor cores; monitoring a task execution environment while the plurality of processor cores perform the plurality of tasks based on at least one operating condition; and allocating a plurality of cache areas of at least one cache memory to the plurality of processor cores based on the plurality of characteristic information and the task execution environment. Sizes of the plurality of cache areas are set differently for the plurality of processor cores.

20 Claims, 14 Drawing Sheets

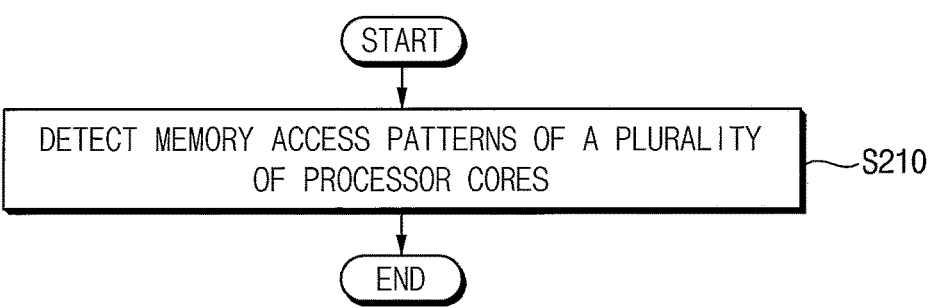

START

DETECT MEMORY ACCESS PATTERNS OF A PLURALITY
OF PROCESSOR CORES ———S210

END

FIG. 4

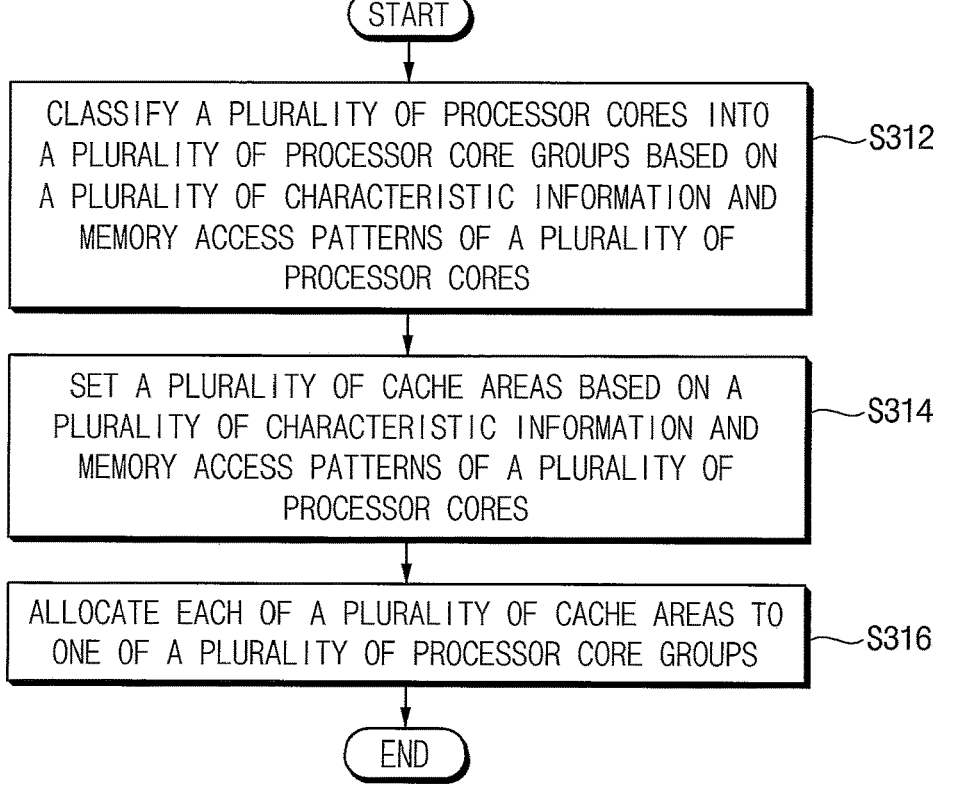

START

CLASSIFY A PLURALITY OF PROCESSOR CORES INTO
A PLURALITY OF PROCESSOR CORE GROUPS BASED ON
A PLURALITY OF CHARACTERISTIC INFORMATION AND
MEMORY ACCESS PATTERNS OF A PLURALITY OF
PROCESSOR CORES ———S312

SET A PLURALITY OF CACHE AREAS BASED ON A
PLURALITY OF CHARACTERISTIC INFORMATION AND
MEMORY ACCESS PATTERNS OF A PLURALITY OF
PROCESSOR CORES ———S314

ALLOCATE EACH OF A PLURALITY OF CACHE AREAS TO
ONE OF A PLURALITY OF PROCESSOR CORE GROUPS ———S316

END

F I G. 6
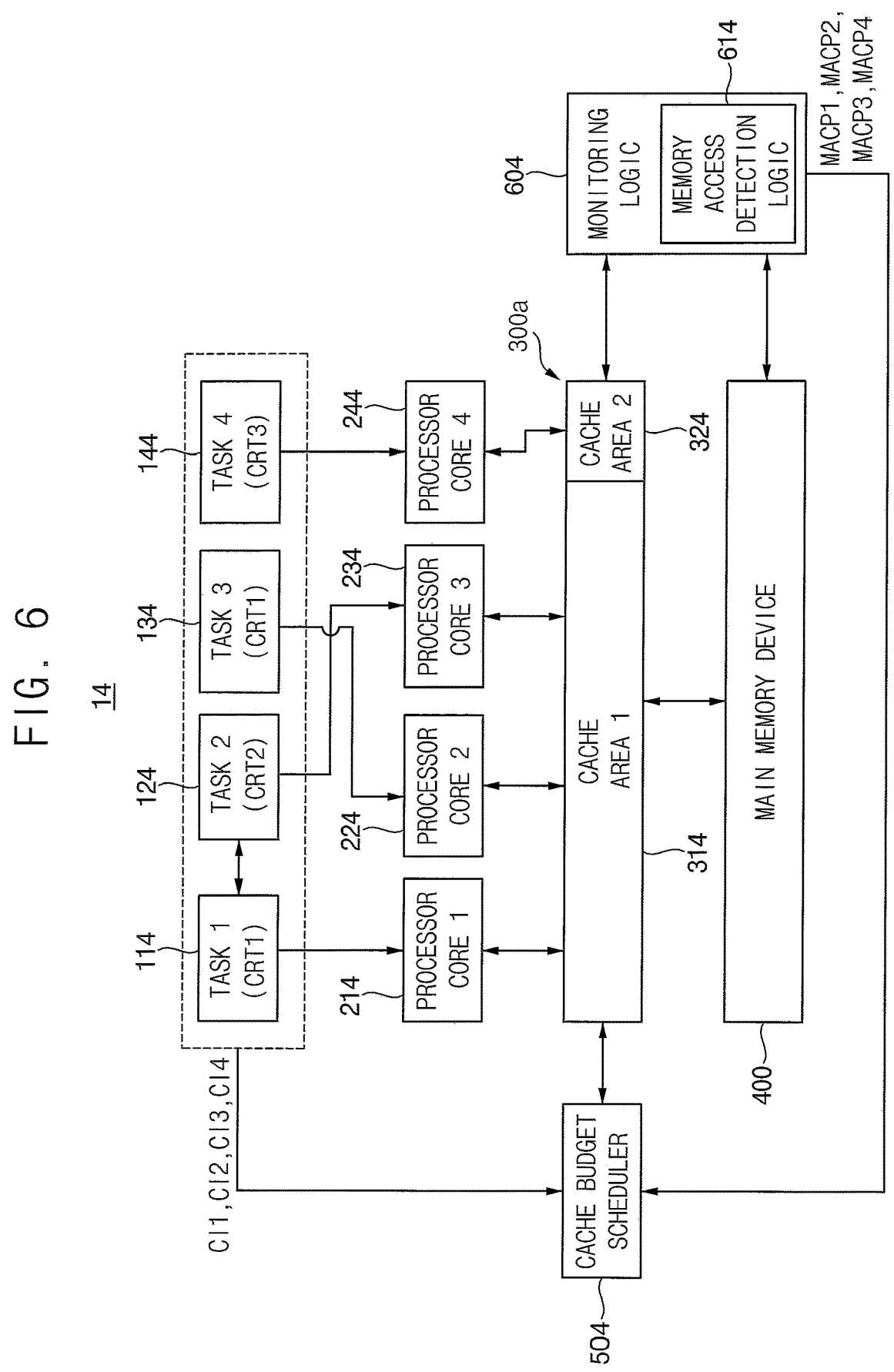

START

DETECT PRIORITIES OF A PLURALITY OF TASKS — S220

END

START

SET A PLURALITY OF CACHE AREAS BASED ON A
PLURALITY OF CHARACTERISTIC INFORMATION AND
PRIORITIES OF A PLURALITY OF TASKS — S322

ALLOCATE EACH OF A PLURALITY OF CACHE AREAS
TO ONE OF A PLURALITY OF PROCESSOR CORES — S324

END

FIG. 13

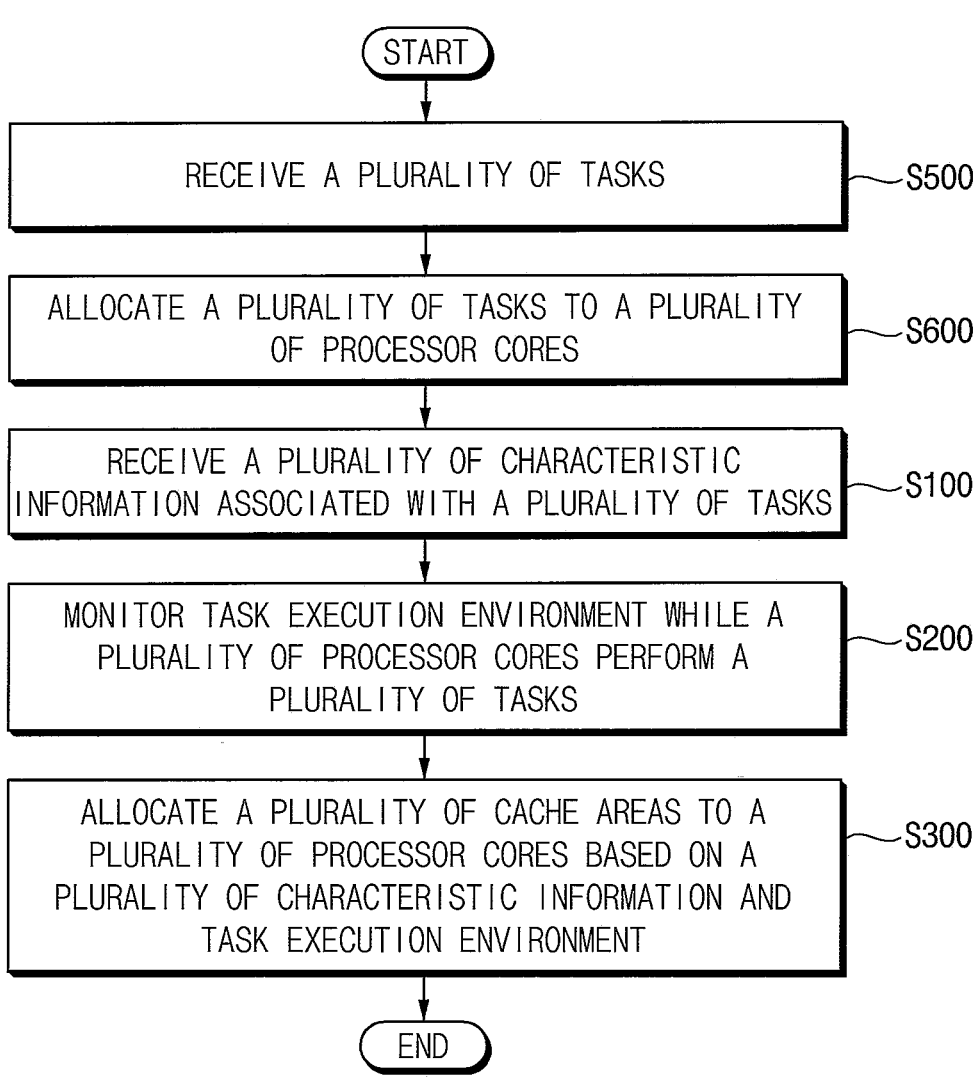

START

RECEIVE A PLURALITY OF TASKS ~S500

ALLOCATE A PLURALITY OF TASKS TO A PLURALITY OF PROCESSOR CORES ~S600

RECEIVE A PLURALITY OF CHARACTERISTIC INFORMATION ASSOCIATED WITH A PLURALITY OF TASKS ~S100

MONITOR TASK EXECUTION ENVIRONMENT WHILE A PLURALITY OF PROCESSOR CORES PERFORM A PLURALITY OF TASKS ~S200

ALLOCATE A PLURALITY OF CACHE AREAS TO A PLURALITY OF PROCESSOR CORES BASED ON A PLURALITY OF CHARACTERISTIC INFORMATION AND TASK EXECUTION ENVIRONMENT ~S300

END

METHOD OF SCHEDULING CACHE BUDGET IN MULTI-CORE PROCESSING DEVICE AND MULTI-CORE PROCESSING DEVICE PERFORMING THE SAME

CROSS-REFERENCE TO RELATED APPLICATION

This application claims priority to Korean Patent Application No. 10-2021-0192203, filed on Dec. 30, 2021 in the Korean Intellectual Property Office (KIPO), the disclosure of which is incorporated herein by reference in its entirety.

BACKGROUND

1. Field

Example embodiments relate generally to semiconductor integrated circuits, and more particularly to methods of scheduling cache budget in multi-core processing devices, and multi-core processing devices performing the methods of scheduling cache budget.

2. Description of Related Art

An operating system (OS) executed by a computing system manages all hardware resources and software resources in the computing system. To perform or complete a series of tasks, the OS manages the processing order of tasks and resources required for the tasks, and a processor or a processing device such as a central processing unit (CPU) or an application processor (AP) performs most of the tasks. Recently, to enhance or improve performance, computing systems including a plurality of processors or processor cores have been developed.

A computing system may include a memory device and a cache memory. In this case, the computing system may reduce read time by storing data of high access frequency in the cache memory. However, as storage capacity of the memory device is increased, complexity and capacity of the cache memory increase.

SUMMARY

At least one example embodiment provides a method of efficiently scheduling cache budget in a multi-core processing device.

At least one example embodiment provides a multi-core processing device performing the method of scheduling cache budget.

According to example embodiments, a method includes: receiving a plurality of characteristic information associated with a plurality of tasks allocated to a plurality of processor cores; monitoring a task execution environment while the plurality of processor cores perform the plurality of tasks based on at least one operating condition; and allocating a plurality of cache areas of at least one cache memory to the plurality of processor cores based on the plurality of characteristic information and the task execution environment. Sizes of the plurality of cache areas are set differently for the plurality of processor cores.

According to example embodiments, a multi-core processing device includes: a plurality of processor cores configured to receive and perform a plurality of tasks, each of the plurality of tasks being allocated to one of the plurality of processor cores; at least one cache memory communicably coupled to the plurality of processor cores, and including a plurality of cache areas; monitoring logic circuitry configured to monitor a task execution environment while the plurality of processor cores perform the plurality of tasks based on at least one operating condition; and cache budget scheduling circuitry configured to receive a plurality of characteristic information associated with the plurality of tasks and a result of monitoring the task execution environment, set the plurality of cache areas based on the plurality of characteristic information and the task execution environment, and allocate the plurality of cache areas to the plurality of processor cores. Sizes of the plurality of cache areas are set differently for the plurality of processor cores.

According to example embodiments, a method includes: receiving a plurality of tasks; allocating the plurality of tasks to a plurality of processor cores; receiving a plurality of characteristic information associated with the plurality of tasks; detecting memory access patterns of the plurality of processor cores while the plurality of processor cores perform the plurality of tasks; classifying the plurality of processor cores into a plurality of processor core groups based on the plurality of characteristic information and the memory access patterns; setting a plurality of cache areas on a cache memory based on the plurality of characteristic information and the memory access patterns, wherein sizes of the plurality of cache areas are set to be different from each other; and allocating the plurality of cache areas to the plurality of processor core groups such that processor cores included in a same processor core group are allocated to a same cache area, and processor cores to which tasks having a same attribute are allocated are included in the same processor core group, or processor cores to which tasks operating using a same resource are allocated are included in the same processor core group. The setting includes increasing a size of a cache area allocated to a processor core group, among the plurality of processor core groups, as a number of memory accesses of the processor core group increases.

In the method of scheduling cache budget in the multi-core processing device and the multi-core processing device according to example embodiments, the plurality of cache areas may be allocated to the plurality of processor cores based on the plurality of characteristic information associated with the plurality of tasks and the task execution environment while the plurality of tasks are performed. For example, the plurality of cache areas may be adaptively and/or dynamically set and allocated in consideration of various criteria or conditions such as the memory access patterns, the priorities, the consumed currents, and/or the like. Accordingly, in the multi-core processing device, disadvantages caused by competition between processor cores may be reduced or minimized, victims of the cache memory may be reduced or minimized, and a hit ratio of the cache memory may be increased. As a result, the multi-core processing device may have improved or enhanced performance.

BRIEF DESCRIPTION OF THE DRAWINGS

Illustrative, non-limiting example embodiments will be more clearly understood from the following detailed description taken in conjunction with the accompanying drawings.

FIG. 3 is a flowchart illustrating an example of monitoring a task execution environment in FIG. 1.

FIG. 4 is a flowchart illustrating an example of allocating a plurality of cache areas to a plurality of processor cores in FIG. 1.

FIGS. 5 and 6 are diagrams for describing operations of FIGS. 3 and 4.

FIG. 13 is a flowchart illustrating a method of scheduling cache budget in a multi-core processing device according to example embodiments.

FIGS. 14A and 14B are block diagrams illustrating a multi-processor system according to example embodiments.

DETAILED DESCRIPTION

Figure 1:
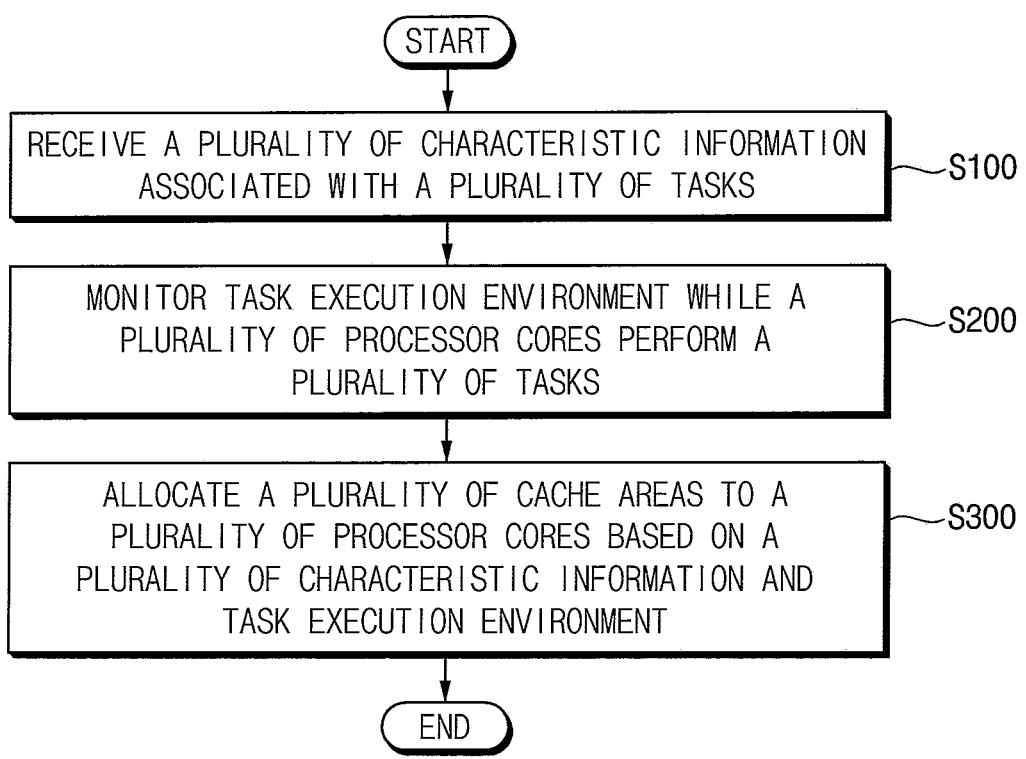
FIG. 1 is a flowchart illustrating a method of scheduling cache budget in a multi-core processing device according to example embodiments.

Various example embodiments will be described more fully with reference to the accompanying drawings, in which example embodiments are shown. The present disclosure may, however, be embodied in many different forms and should not be construed as limited to the example embodiments set forth herein. Like reference numerals refer to like elements throughout this application.

FIG. 1 is a flowchart illustrating a method of scheduling cache budget in a multi-core processing device according to example embodiments.

Referring to FIG. 1, a method of scheduling cache budget according to example embodiments is performed by a multi-core processing device that includes a plurality of processor cores and at least one cache memory. For example, the at least one cache memory may be shared by some of the plurality of processor cores, or may be implemented for each of the plurality of processor cores. Example configurations of the multi-core processing device will be described in detail with reference to FIGS. 2A and 2B.

In the method of scheduling cache budget in the multi-core processing device according to example embodiments, a plurality of characteristic information associated with or related to a plurality of tasks (or jobs) allocated to the plurality of processor cores are received (operation S100). For example, the plurality of characteristic information may be included in the plurality of tasks, or may be provided together with the plurality of tasks.

In some example embodiments, as will be described with reference to FIG. 13, the plurality of tasks may be received and the plurality of tasks may be allocated or assigned to the plurality of processor cores, before operation S100 is performed.

Based on at least one operating condition, a task execution environment while the plurality of processor cores perform the plurality of tasks is monitored (operation S200).

Examples of operation S200 will be described in detail with reference to FIGS. 3, 7 and 10.

In some example embodiments, as will be described with reference to FIG. 3, the task execution environment may be monitored based on memory access patterns of the plurality of processor cores for performing the plurality of tasks. For example, the memory access patterns may correspond to the at least one operating condition.

In other example embodiments, as will be described with reference to FIG. 7, the task execution environment may be monitored based on priorities of the plurality of tasks. For example, the priorities may correspond to the at least one operating condition.

In other example embodiments, as will be described with reference to FIG. 10, the task execution environment may be monitored based on currents consumed by the plurality of processor cores. For example, the consumed currents may correspond to the at least one operating condition.

However, example embodiments are not limited thereto, and the task execution environment may be monitored based on other information such as temperature information. For example, the temperature information may correspond to the at least one operating condition.

Based on the plurality of characteristic information and the task execution environment, a plurality of cache areas included in the at least one cache memory are allocated to the plurality of processor cores (operation S300). Sizes of the plurality of cache areas are set or determined differently for the plurality of processor cores. Examples of operation S300 will be described in detail with reference to FIGS. 4, 8 and 11.

In some example embodiments, operations S100, S200, and S300 may be performed in real time or during runtime while the multi-core processing device operates or is driven. For example, the sizes of the plurality of cache areas may be adaptively and/or dynamically set, and then the plurality of cache areas in which the sizes are adaptively and/or dynamically set may be allocated to the plurality of processor cores.

A processing device such as a central processing unit (CPU) may include a logic circuit such as an arithmetic logic unit (ALU) for performing computations and/or calculations, and a cache memory for loading data required for the computations and/or calculations. A capacity of the cache memory may be limited depending on a design of the processing device. Depending on how the cache memory with the limited capacity is used, there may be differences in execution performance of tasks, current consumptions, and/or the like.

Recently, a multi-core processing device including a plurality of processor cores has been researched and used. In the multi-core processing device, different processor cores may compete with each other to use the cache memory, and there may be disadvantages due to such competition. In the related art, a cache area is allocated as requested by a processor core without considering characteristics of tasks, and there are problems in that unnecessary disadvantages may occur due to a task using a large amount of the cache memory.

In the method of scheduling cache budget in the multi-core processing device according to example embodiments, the plurality of cache areas may be allocated to the plurality of processor cores based on the plurality of characteristic information associated with the plurality of tasks and the task execution environment while the plurality of tasks are performed. For example, the plurality of cache areas may be adaptively and/or dynamically set and allocated in consideration of various criteria or conditions such as the memory access patterns, the priorities, the consumed currents, and/or the like. Accordingly, in the multi-core processing device, disadvantages caused by competition between processor cores may be reduced or minimized, victims of the cache memory may be reduced or minimized, and a hit ratio of the cache memory may be increased. As a result, the multi-core processing device may have improved or enhanced performance.

Figure 2A:
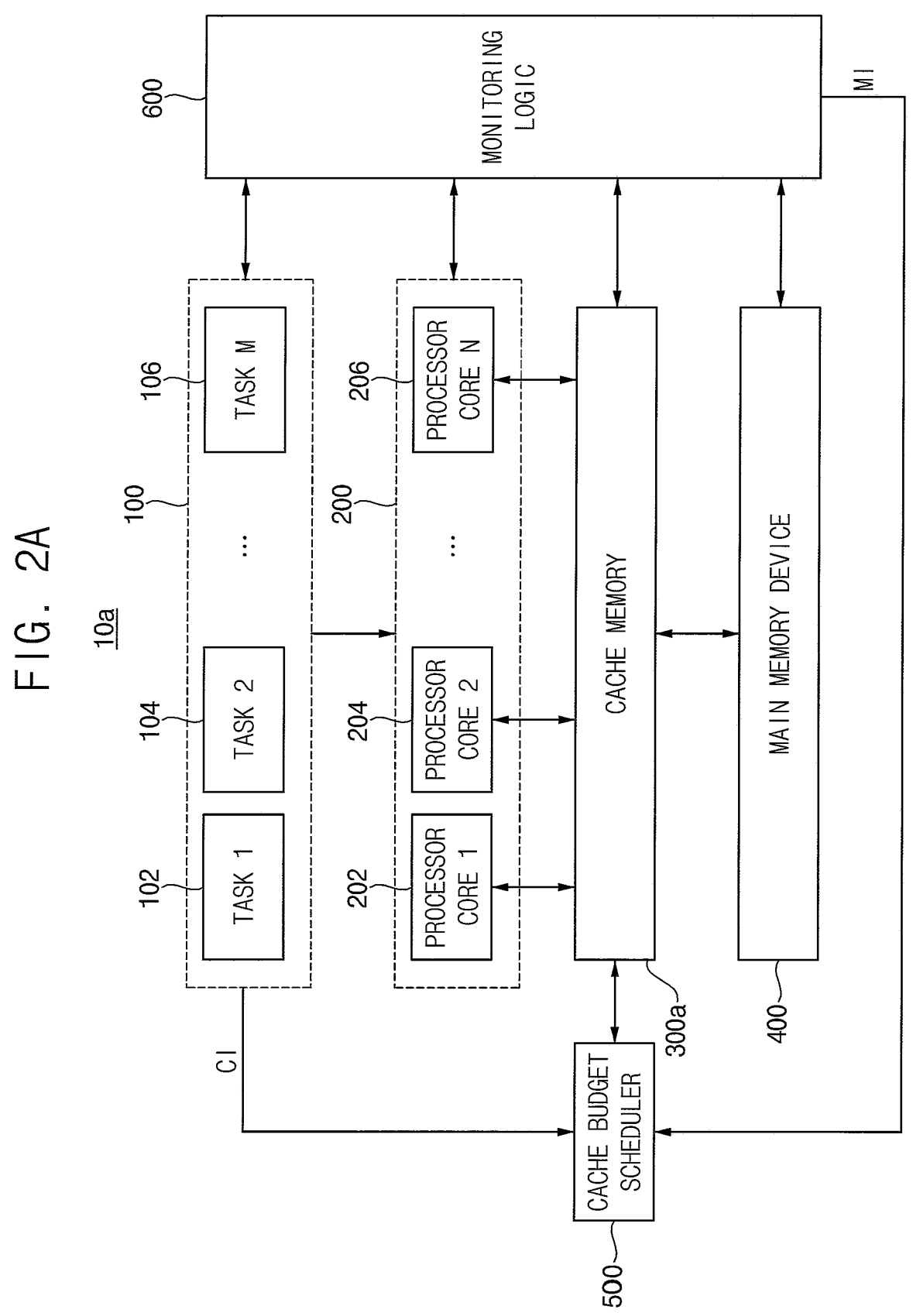
FIGS. 2A and 2B are block diagrams illustrating a multi-core processing device according to example embodiments.
Figure 2B:
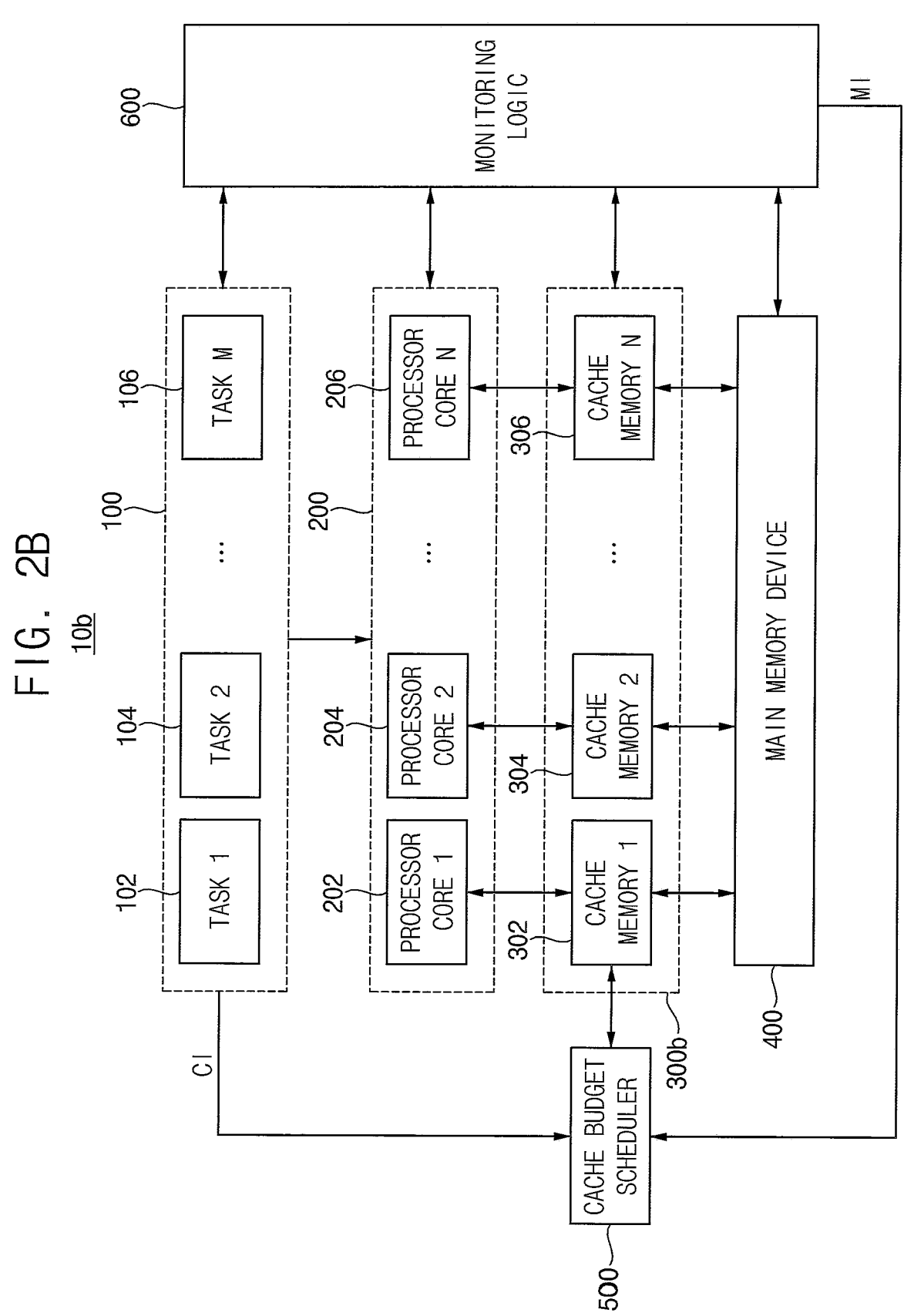

FIGS. 2A and 2B are block diagrams illustrating a multi-core processing device according to example embodiments.

Referring to FIG. 2A, a multi-core processing device 10*a* includes a plurality of processor cores 200, a cache memory 300*a*, a cache budget scheduler 500 and a monitoring logic 600. The multi-core processing device 10*a* may further include a main memory device 400. The plurality of processor cores 200 may include first to N-th processor cores 202, 204 and 206, where N is a natural number greater than or equal to two.

In some example embodiments, the multi-core processing device 10*a* may be implemented in the form of an application processor (AP) or a system on chip (SOC). However, example embodiments are not limited thereto, and the multi-core processing device 10*a* may be one of various data processing devices such as a central processing unit (CPU), a graphic processing unit (GPU), and/or the like.

The multi-core processing device 10*a* receives a plurality of tasks 100, and performs and/or executes the plurality of tasks 100 using the plurality of processor cores 200, the cache memory 300*a* and the main memory device 400. The plurality of processor cores 200 may perform computations and/or calculations, and the cache memory 300*a* and the main memory device 400 may store data required for the computations and/or calculations.

Each of the plurality of tasks 100 may include instructions used to perform the computations and/or calculations. For example, the plurality of tasks 100 may include first to M-th tasks 102, 104 and 106, where M is a natural number greater than or equal to two. For example, the plurality of tasks 100 may be received based on a user request. In some example embodiments, the plurality of tasks 100 may be sequentially received. In other example embodiments, at least some of the plurality of tasks 100 may be substantially simultaneously or concurrently received.

In some example embodiments, each of the plurality of tasks 100 may correspond to one application or program executed on an operating system (OS). For example, the application or program may include a video player, a game, a web browser, and/or the like.

In other example embodiments, each of the plurality of tasks 100 may correspond to a portion of an operation performed in one application or program. For example, execution of the application or program may be defined as a process, and a unit operation that is obtained by dividing such process and is capable of scheduling may be defined as a task. For example, one process may include a series of tasks, and the series of tasks may correspond to the plurality of tasks 100.

The plurality of processor cores 200 may receive the plurality of tasks 100, and perform the plurality of tasks 100. One or more of the plurality of tasks 100 may be allocated to each of the plurality of processor cores 200. The plurality of processor cores 200 may execute various functions, such as specific operations, to perform the plurality of tasks 100.

In some example embodiments, one task may be allocated to one processor core. In other example embodiments, two or more tasks may be allocated to one processor core. In still other example embodiments, one task may be allocated to two or more processor cores. The multi-core processing device 10*a* may further include a task scheduler that allocates the plurality of tasks 100 to the plurality of processor cores 200.

In some example embodiments, the plurality of tasks 100 may be sequentially performed by the plurality of processor cores 200. In other example embodiments, at least some of the plurality of tasks 100 may be substantially simultaneously performed by at least some of the plurality of processor cores 200.

In some example embodiments, each of the plurality of processor cores 200 may be included in one of a plurality of clusters that are physically separated from each other in a hardware configuration. A single cluster may form one power domain which independently and individually controls power. For example, the first processor core 202 may be included in a first cluster forming a first power domain, and the second processor core 204 may be included in a second cluster forming a second power domain that is physically separated from the first power domain.

The cache memory 300*a* is used to perform the plurality of tasks 100 by the plurality of processor cores 200. For example, the cache memory 300*a* may store data required for computations and/or calculations performed by the plurality of processor cores 200.

In addition, as will be described with reference to FIGS. 5, 6 and 9, the cache memory 300*a* includes a plurality of cache areas. Sizes of the plurality of cache areas may be set differently for the plurality of processor cores 200. For example, each of the plurality of cache areas may be a portion of the cache memory 300*a*.

As shown in FIG. 2A, the cache memory 300*a* may have a shared cache structure, and may be shared by the plurality of processor cores 200.

In a computing system, a cache memory is a hardware or software component that stores data so that future requests for that data can be served faster. The data stored in the cache memory may be the result of an earlier computation or a copy of data stored elsewhere. A cache hit may occur when requested data can be found in the cache memory, while a cache miss occurs when the requested data cannot be found in the cache memory. The cache hit may be served by reading the data from the cache memory, which is faster than recomputing a result or reading from a slower memory device, and thus, the more requests that can be served from the cache memory, the faster the system performs.

As with the cache memory 300*a*, the main memory device 400 may be used to perform the plurality of tasks 100 by the plurality of processor cores 200. For example, the main memory device 400 may store data required for computations and/or calculations performed by the plurality of processor cores 200.

In some example embodiments, the main memory device 400 may have a capacity larger than that of the cache memory 300*a*, and may have an operating speed slower than that of the cache memory 300*a*. For example, the main memory device 400 may include at least one volatile memory device such as a dynamic random access memory (DRAM), a synchronous DRAM (SDRAM), a static random access memory (SRAM), or the like, and/or at least one nonvolatile memory device such as a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), or the like. Alternatively, the main memory device 400 may include a solid state drive or solid state disk (SSD), an embedded SSD (eSSD), a multimedia card (MMC), an embedded MMC (eMMC), a universal flash storage (UFS), or the like.

Although FIG. 2A illustrates that the main memory device 400 is included in the multi-core processing device 10a, example embodiments are not limited thereto, and the main memory device 400 may be disposed or located outside the multi-core processing device 10a.

The monitoring logic 600 may monitor a task execution environment while the plurality of processor cores 200 perform the plurality of tasks 100 based on at least one operating condition, and generate monitoring information MI that represents a result of monitoring the task execution environment. In this regard, the monitoring logic 600 may perform operation S200 in FIG. 1.

In some example embodiments, as will be described with reference to FIGS. 5 and 6, the monitoring logic 600 may include a memory access detection logic. In this example, the task execution environment may be monitored based on memory access patterns of the plurality of processor cores 200 for performing the plurality of tasks 100.

In other example embodiments, as will be described with reference to FIG. 9, the monitoring logic 600 may include a priority detection logic. In this example, the task execution environment may be monitored based on priorities of the plurality of tasks 100.

In still other example embodiments, as will be described with reference to FIG. 12, the monitoring logic 600 may include a current detection logic. In this example, the task execution environment may be monitored based on currents consumed by the plurality of processor cores 200.

The cache budget scheduler 500 may receive a plurality of characteristic information CI associated with the plurality of tasks 100, receive the monitoring information MI that represents the result of monitoring the task execution environment, set the plurality of cache areas on the cache memory 300a based on the plurality of characteristic information CI and the task execution environment (e.g., the monitoring information MI), and allocate the plurality of cache areas to the plurality of processor cores 200. The sizes of the plurality of cache areas may be set differently for the plurality of processor cores 200. In this regard, the cache budget scheduler 500 may perform operations S100 and S300 in FIG. 1.

For example, the plurality of characteristic information CI may include attributes of properties of the plurality of tasks 100. For another example, as will be described with reference to FIG. 4, when the plurality of tasks 100 and the plurality of processor cores 200 are grouped or classified, the plurality of characteristic information CI may include attributes and information of a group in which the plurality of tasks 100 are included. Alternatively, the plurality of characteristic information CI may include a history of using the cache memory 300a (or a cache usage history) by the plurality of tasks 100. However, example embodiments are not limited thereto, and the plurality of characteristic information CI may further include various other parameters and/or factors.

In some example embodiments, at least some components of the cache budget scheduler 500 and the monitoring logic 600 may be implemented as hardware. For example, the cache budget scheduler 500 and the monitoring logic 600 may include circuitry such as transistors, capacitors, logic gates, and other circuit elements to implement certain functionality described herein. For example, at least some components of the cache budget scheduler 500 and the monitoring logic 600 may be included in a computer-based electronic system. In other example embodiments, at least some components of the cache budget scheduler 500 and the monitoring logic 600 may be implemented as instruction codes or program routines (e.g., a software program). For example, the instruction codes or the program routines may be executed by a computer-based electronic system, and may be stored in any storage device located inside or outside the computer-based electronic system.

Referring to FIG. 2B, a multi-core processing device 10b includes a plurality of processor cores 200, a plurality of cache memories 300b, a cache budget scheduler 500 and a monitoring logic 600. The multi-core processing device 10b may further include a main memory device 400.

The multi-core processing device 10b of FIG. 2B may be substantially similar to the multi-core processing device 10a of FIG. 2A, except that the multi-core processing device 10b further includes the plurality of cache memories 300b. The descriptions repeated with FIG. 2A will be omitted.

As shown in FIG. 2B, the plurality of cache memories 300b may be implemented to correspond to the plurality of processor cores 200, respectively. In this regard, FIG. 2B illustrates a private cache structure.

For example, the plurality of cache memories 300b may include first to N-th cache memories 302, 304 and 306. The first cache memory 302 may correspond to the first processor core 202, may be used to perform at least one of the plurality of tasks 100 by the first processor core 202, and may store data required for computations and/or calculations performed by the first processor core 202. The second cache memory 304 may correspond to the second processor core 204, may be used to perform at least one of the plurality of tasks 100 by the second processor core 204, and may store data required for computations and/or calculations performed by the second processor core 204. The N-th cache memory 306 may correspond to the N-th processor core 206, may be used to perform at least one of the plurality of tasks 100 by the N-th processor core 206, and may store data required for computations and/or calculations performed by the N-th processor core 206.

In addition, as will be described with reference to FIG. 12, the plurality of cache memories 300b may include a plurality of cache areas. Sizes of the plurality of cache areas may be set differently for the plurality of processor cores 200. For example, each of the plurality of cache areas may be a portion or all of one of the plurality of cache memories 300b.

Although FIG. 2A illustrates the shared cache structure in which one cache memory 300a is shared by the plurality of processor cores 200, and although FIG. 2B illustrates the private cache structure in which each of the plurality of cache memories 300b is used by a respective one of the plurality of processor cores 200, example embodiments are not limited thereto. For example, the multi-core processing device may include two or more cache memories. Each cache memory may be shared by two or more processor cores, similar to the shared cache structure, or may be used by one processor core, similar to the private cache structure. As described above, a structure in which the shared cache structure and the private cache structure are combined or mixed may be referred to as a complex cache structure.

FIG. 3 is a flowchart illustrating an example of monitoring a task execution environment in FIG. 1.

Referring to FIGS. 1 and 3, when monitoring the task execution environment while the plurality of processor cores perform the plurality of tasks (operation S200), memory access patterns of the plurality of processor cores for performing the plurality of tasks may be detected (operation S210). For example, the memory access patterns of the plurality of processor cores may be detected based on commands, addresses and data exchanged between the at least one cache memory and the main memory device.

In some example embodiments, the memory access patterns of the plurality of processor cores may include the number (or quantity) of accesses to the at least one cache memory while the plurality of processor cores perform the plurality of tasks, and/or amount of data in the at least one cache memory accessed while the plurality of processor cores perform the plurality of tasks. For example, the number of times the at least one cache memory is accessed by the plurality of processor cores may be counted, or the amount of data in the at least one cache memory accessed by the plurality of processor cores may be measured. For example, during a specific time interval from a predetermined past time point to a present time point, the number of times of the at least one cache memory is accessed may be counted, or the amount of data in the at least one cache memory that is accessed may be measured.

In other example embodiments, the memory access patterns of the plurality of processor cores may include a history of using the at least one cache memory while the plurality of processor cores perform the plurality of tasks.

However, example embodiments are not limited thereto, and the memory access patterns of the plurality of processor cores may be detected in various other manners.

FIG. 4 is a flowchart illustrating an example of allocating a plurality of cache areas to a plurality of processor cores in FIG. 1.

Referring to FIGS. 1 and 4, when allocating the plurality of cache areas to the plurality of processor cores based on the plurality of characteristic information and the task execution environment (operation S300), the plurality of processor cores may be classified or divided into a plurality of processor core groups based on the plurality of characteristic information and the memory access patterns of the plurality of processor cores (operation S312).

In some example embodiments, as will be described with reference to FIG. 5, the plurality of processor cores may be classified into the plurality of processor core groups such that processor cores to which tasks having the same attribute are allocated are included in the same processor core group.

In other example embodiments, as will be described with reference to FIG. 6, the plurality of processor cores may be classified into the plurality of processor core groups such that processor cores to which tasks operating using the same resource are allocated, even if the tasks have different attributes, are included in the same processor core group.

The plurality of cache areas of the at least one cache memory may be set based on the plurality of characteristic information and the memory access patterns of the plurality of processor cores (operation S314). Each of the plurality of cache areas may be allocated to one of the plurality of processor core groups (operation S316). For example, the sizes of the plurality of cache areas may be set differently for the plurality of processor core groups.

In some example embodiments, as will be described with reference to FIGS. 5 and 6, as the number of memory accesses of a processor core group increases, a size of a cache area allocated to the processor core group may increase.

Figure 5:
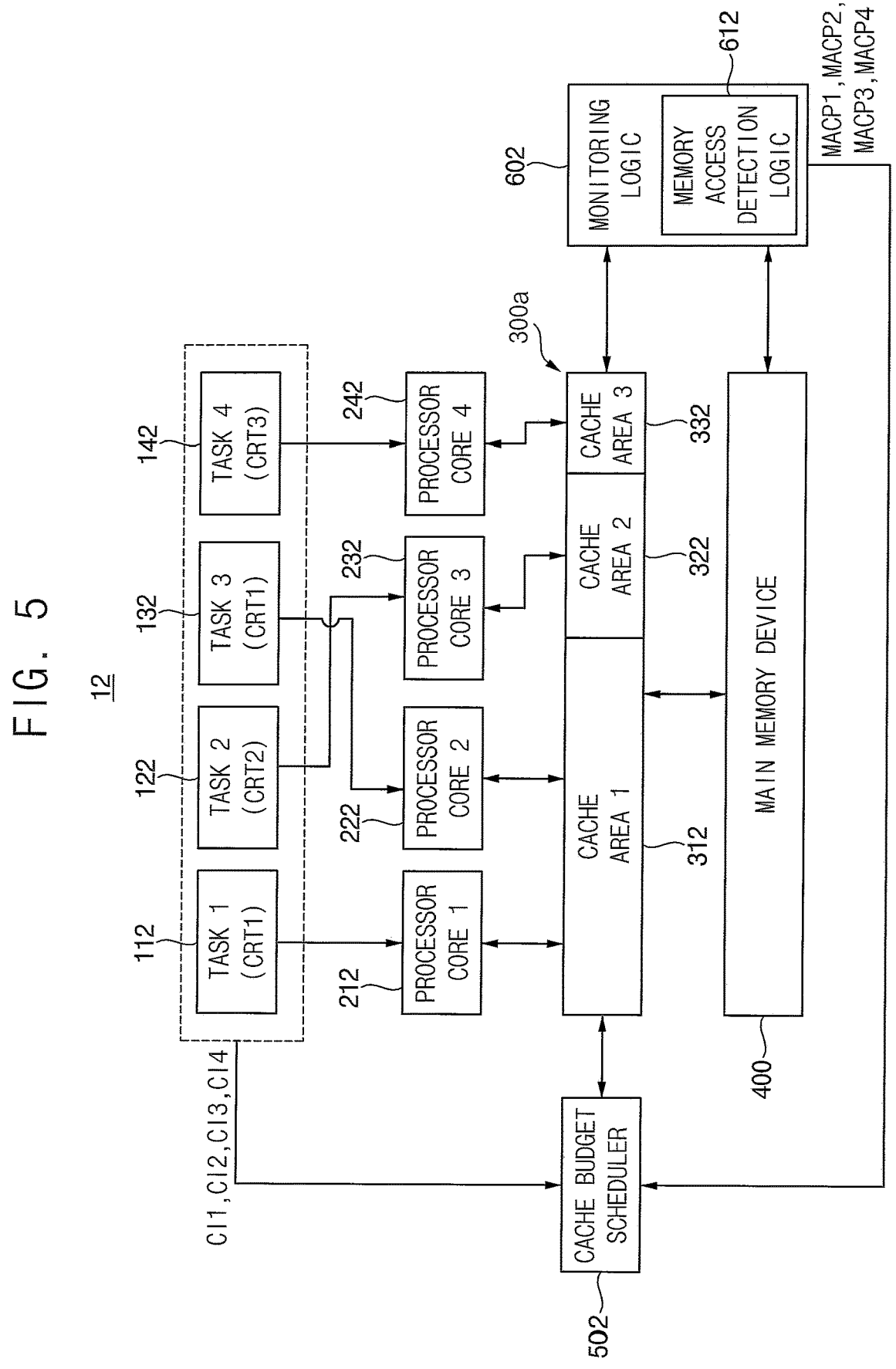

FIGS. 5 and 6 are diagrams for describing operations of FIGS. 3 and 4. The descriptions repeated with FIG. 2A will be omitted.

Referring to FIG. 5, a multi-core processing device 12 may include first, second, third and fourth processor cores 212, 222, 232 and 242, a cache memory 300a, a main memory device 400, a cache budget scheduler 502 and a monitoring logic 602. The multi-core processing device 12 of FIG. 5 may have a shared cache structure in which the cache memory 300a is shared by the first to fourth processor cores 212 to 242. For example, the cache budget scheduler 502 and the monitoring logic 602 may include circuitry such as transistors, capacitors, logic gates, and other circuit elements to implement certain functionality described herein.

The first to fourth processor cores 212 to 242 may receive and execute first, second, third and fourth tasks 112, 122, 132 and 142. For example, the first task 112 may be allocated to the first processor core 212, the second task 122 may be allocated to the third processor core 232, the third task 132 may be allocated to the second processor core 222, and the fourth task 142 may be allocated to the fourth processor core 242. However, example embodiments are not limited thereto, and each task may be allocated to an arbitrary processor core and may be executed by the arbitrary processor core.

The monitoring logic 602 may include a memory access detection logic 612. The memory access detection logic 612 may communicate with the cache memory 300a and the main memory device 400, and may detect first, second, third and fourth memory access patterns MACP1, MACP2, MACP3 and MACP4 associated with the first to fourth processor cores 212 to 242. For example, the first memory access pattern MACP1 may be associated with an operation of the first processor core 212 to access the main memory device 400 for performing the first task 112. The second memory access pattern MACP2 may be associated with an operation of the second processor core 222 to access the main memory device 400 for performing the third task 132. The third memory access pattern MACP3 may be associated with an operation of the third processor core 232 to access the main memory device 400 for performing the second task 122. The fourth memory access pattern MACP4 may be associated with an operation of the fourth processor core 242 to access the main memory device 400 for performing the fourth task 142.

The cache budget scheduler 502 may receive first characteristic information CI1 associated with the first task 112, second characteristic information CI2 associated with the second task 122, third characteristic information CI3 associated with the third task 132, and fourth characteristic information CI4 associated with the fourth task 142. In addition, the cache budget scheduler 502 may receive the first to fourth memory access patterns MACP1 to MACP4 of the first to fourth processor cores 212 to 242 from the memory access detection logic 612.

The cache budget scheduler 502 may control and/or adjust a present usage of the cache memory 300a in real time using the first to fourth characteristic information CI1 to CI4 and the first to fourth memory access patterns MACP1 to MACP4 together.

For example, based on the first to fourth characteristic information CI1 to CI4 and the first to fourth memory access patterns MACP1 to MACP4, the cache budget scheduler 502 may identify tasks that have the same attribute. For example, the cache budget scheduler 502 may determine that the first task 112 and the third task 132 have a first attribute CRT1 (e.g., have the same attribute), may determine that the second task 122 has a second attribute CRT2 different from the first attribute CRT1, and may determine that the fourth task 142 has a third attribute CRT3 different from the first attribute CRT1 and the second attribute CRT2. For example, the first attribute CRT1 may represent a memory intensive task (or workload) in which the usage of the cache memory 300a is larger than a first reference usage (e.g., the number of times of memory accesses is relatively large). The second attribute CRT2 may represent a normal operation in which the usage of the cache memory 300a is less than or equal to the first reference usage and larger than a second reference usage that is less than the first reference usage. The third attribute CRT3 may represent a core intensive operation in which the usage of the cache memory 300a is less than or equal to the second reference usage (e.g., the number of times of memory accesses is relatively less).

In this example, the cache budget scheduler 502 may set or determine a first task group including the first task 112 and the third task 132 that have the same first attribute CRT1, and may set a first processor core group including the first processor core 212 and the second processor core 222 to which the first task 112 and the third task 132 are allocated. The cache budget scheduler 502 may set or determine a second task group including the second task 122 that has the second attribute CRT2, and may set a second processor core group including the third processor core 232 to which the second task 122 is allocated. The cache budget scheduler 502 may set or determine a third task group including the fourth task 142 that has the third attribute CRT3, and may set a third processor core group including the fourth processor core 242 to which the fourth task 142 is allocated.

In addition, the cache budget scheduler 502 may set first, second and third cache areas 312, 322 and 332 on the cache memory 300a. The cache budget scheduler 502 may allocate the first cache area 312 to the first processor core group, may allocate the second cache area 322 to the second processor core group, and may allocate the third cache area 332 to the third processor core group.

For example, the first processor core group may correspond to the first attribute CRT1 with the largest usage of the cache memory 300a, and thus the first cache area 312 allocated to the first processor core group may have the largest size among the cache areas 312 to 332. The second processor core group may correspond to the second attribute CRT2 in which the usage of the cache memory 300a is less than that of the first attribute CRT1, and thus a size of the second cache area 322 allocated to the second processor core group may be smaller than the size of the first cache area 312. The third processor core group may correspond to the third attribute CRT3 with the least usage of the cache memory 300a, and thus the third cache area 332 allocated to the third processor core group may have the smallest size among the cache areas 312 to 332.

As described above, a cache area having larger size may be allocated to a processor core with larger cache usage. Thus, a hit ratio of the cache memory may be increased, and a stall time of the processor core may be reduced. Accordingly, time required to execute the task may be reduced, current consumed by the processor core may be reduced, and utilization of the limited cache resource may be improved or enhanced.

Referring to FIG. 6, a multi-core processing device 14 may include first, second, third and fourth processor cores 214, 224, 234 and 244, a cache memory 300a, a main memory device 400, a cache budget scheduler 504 and a monitoring logic 604. The monitoring logic 604 may include a memory access detection logic 614.

The first to fourth processor cores 214 to 244, the monitoring logic 604 and the memory access detection logic 614 in FIG. 6 may be substantially similar to the first to fourth processor cores 214 to 244, the monitoring logic 602 and the memory access detection logic 612 in FIG. 5, respectively. The first to fourth tasks 114 to 144 and the cache budget scheduler 504 in FIG. 6 may be substantially similar to the first to fourth tasks 112 to 142 and the cache budget scheduler 502 in FIG. 5, respectively. The descriptions repeated with FIG. 5 will be omitted.

The cache budget scheduler 504 may control and/or adjust a present usage of the cache memory 300a in real time using the first to fourth characteristic information CI1 to CI4 and the first to fourth memory access patterns MACP1 to MACP4 together.

For example, based on the first to fourth characteristic information CI1 to CI4 and the first to fourth memory access patterns MACP1 to MACP4, the cache budget scheduler 504 may identify tasks that have the same attribute. For example, the cache budget scheduler 504 may determine that the first task 114 and the third task 134 have the same first attribute CRT1, may determine that the second task 124 has the second attribute CRT2, and may determine that the fourth task 144 has the third attribute CRT3.

In addition, based on the first to fourth characteristic information CI1I to CI4 and the first to fourth memory access patterns MACP1 to MACP4, the cache budget scheduler 504 may identify tasks that use the same resource. For example, the cache budget scheduler 504 may determine that the first task 114 and the second task 124 operate using the same resource. For example, the first task 114 and the second task 124 may be performed by accessing (e.g., writing and/or reading) a shared resource using inter-process communication (IPC), or the like.

In this example, the cache budget scheduler 504 may set or determine a first task group including the first task 114 and the third task 134 that have the same first attribute CRT1 and the second task 124 that has the second attribute CRT2 different from the first attribute CRT1 but operates using the same resource as the first task 114, and may set a first processor core group including the first processor core 214, the second processor core 224 and the third processor core 234 to which the first task 114, the third task 134 and the second task 124 are allocated. The cache budget scheduler 504 may set or determine a second task group including the fourth task 144 that has the third attribute CRT3, and may set a second processor core group including the fourth processor core 244 to which the fourth task 144 is allocated.

In addition, the cache budget scheduler 504 may set first and second cache areas 314 and 324 on the cache memory 300a. The cache budget scheduler 504 may allocate the first cache area 314 to the first processor core group, and may allocate the second cache area 324 to the second processor core group.

For example, the first processor core group may correspond to the first attribute CRT1 with the largest usage of the cache memory 300a, and the second processor core group may correspond to the third attribute CRT3 with the least usage of the cache memory 300a. Thus, a size of the first cache area 314 allocated to the first processor core group may be larger than a size of the second cache area 324 allocated to the second processor core group.

If tasks to be accessed to a shared resource are allocated to different cache areas, it may be necessary to search another cache area or access the main memory device 400 while the tasks are performed. As described above, the processor cores that perform tasks (or threads in the tasks) using the same resource, even if the tasks have different attributes, may be set to the same processor core group, and the same cache area may be allocated to the processor cores included in the same processor core group. Thus, a hit ratio of the cache memory may be increased, and a stall time of the processor core may be reduced.

In some example embodiments, the grouping operation of operation S312 in FIG. 4 may be omitted. In this example, one cache area may be set and allocated to each processor core, and a cache area having larger size may be provided to a processor core with larger cache usage.

Figure 7:
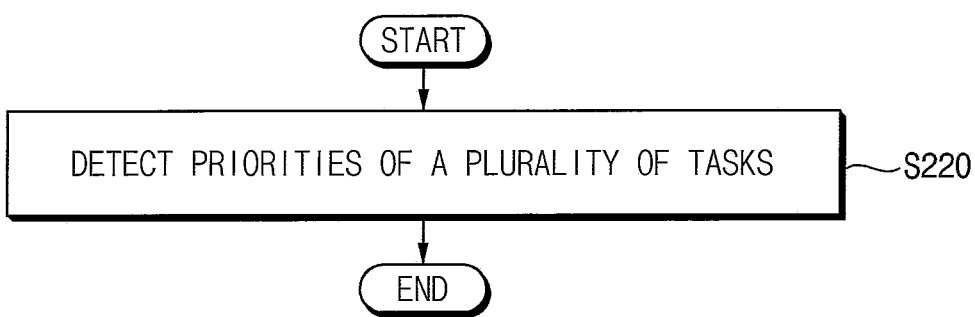
FIG. 7 is a flowchart illustrating another example of monitoring a task execution environment in FIG. 1.

FIG. 7 is a flowchart illustrating another example of monitoring a task execution environment in FIG. 1.

Referring to FIGS. 1 and 7, when monitoring the task execution environment while the plurality of processor cores perform the plurality of tasks (operation S200), priorities of the plurality of tasks may be detected (operation S220).

In some example embodiments, a task that is already allocated to a processor core and is being performed may have higher priority than that of a task that is newly received.

In other example embodiments, as importance of a task becomes higher, a priority of the task may become higher (e.g., the higher the importance, the higher the priority of the task). For example, tasks associated with security, authentication, or the like, may have higher priority.

In still other example embodiments, a predetermined task may have higher priority than other tasks.

However, example embodiments are not limited thereto, and the priorities of the plurality of tasks may be detected in various other manners.

Figure 8:
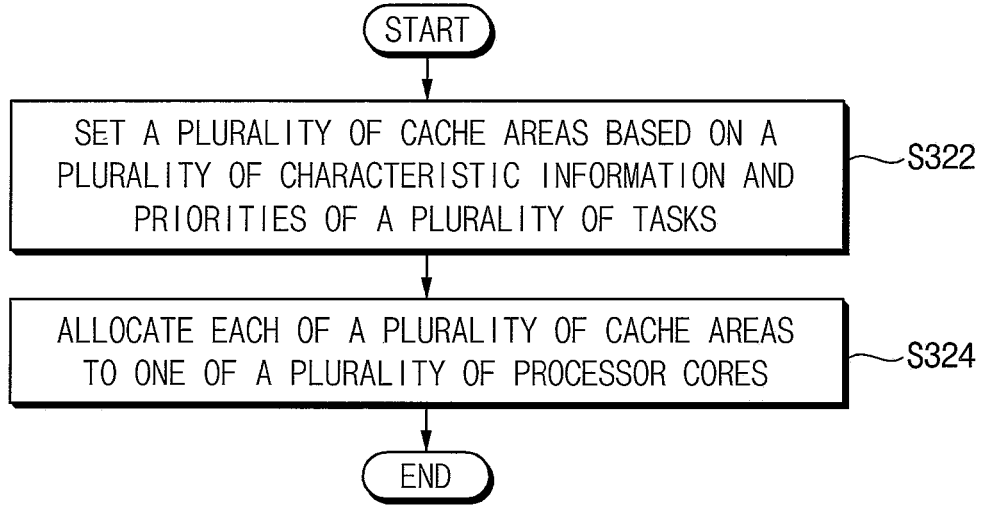
FIG. 8 is a flowchart illustrating another example of allocating a plurality of cache areas to a plurality of processor cores in FIG. 1.

FIG. 8 is a flowchart illustrating another example of allocating a plurality of cache areas to a plurality of processor cores in FIG. 1.

Referring to FIGS. 1 and 8, when allocating the plurality of cache areas to the plurality of processor cores based on the plurality of characteristic information and the task execution environment (operation S300), the plurality of cache areas may be set on the at least one cache memory based on the plurality of characteristic information and the priorities of the plurality of tasks (operation S322). Each of the plurality of cache areas may be allocated to one of the plurality of processor core groups (operation S324). For example, the sizes of the plurality of cache areas may be set differently for the plurality of processor core groups. Operations S322 and S324 in FIG. 8 may be similar to operations S314 and S316 in FIG. 4, respectively.

In some example embodiments, as will be described with reference to FIG. 9, as a priority of a task becomes higher, a size of a cache area allocated to the processor core performing the task may increase.

Figure 9:
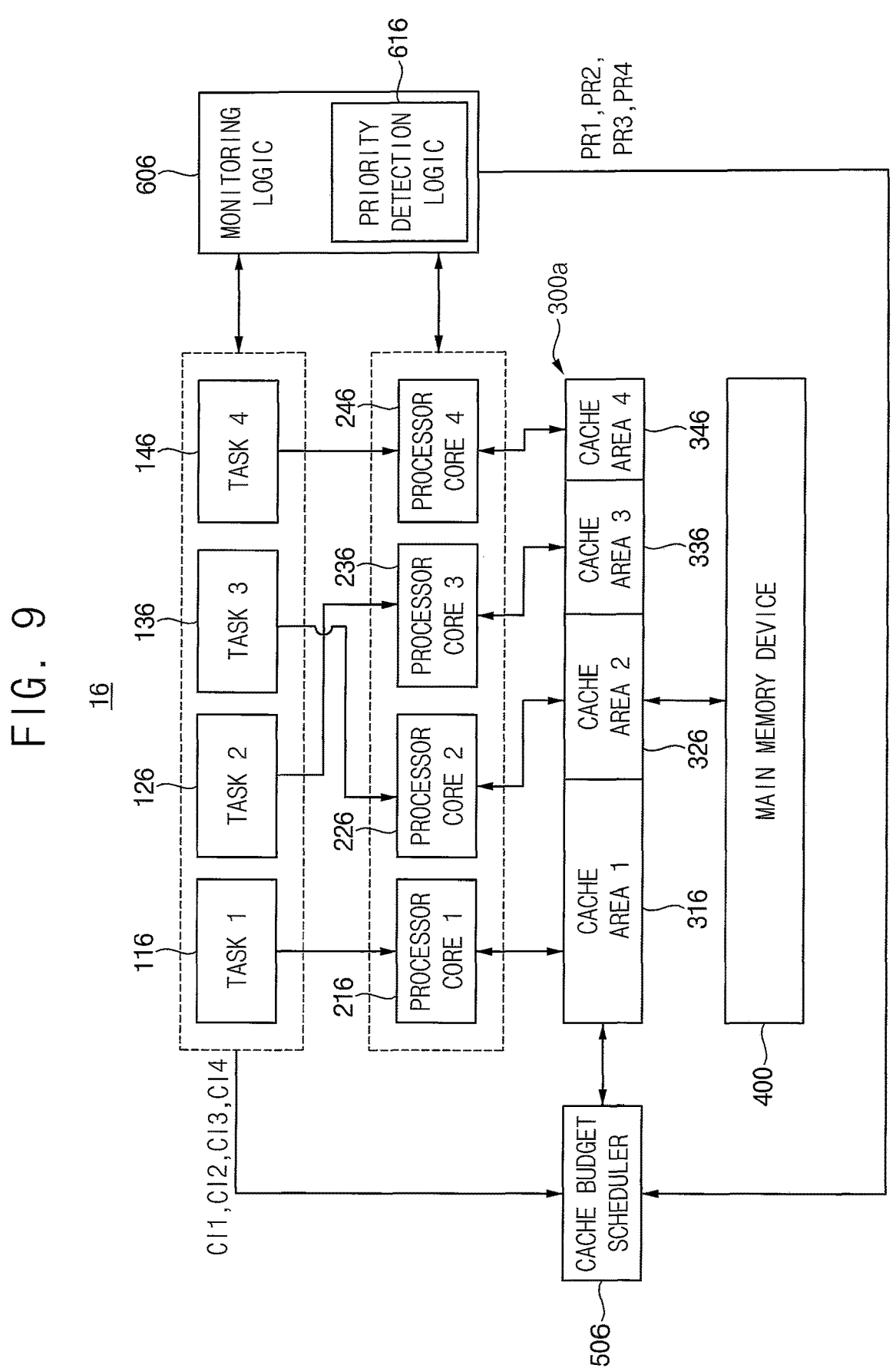
FIG. 9 is a diagram for describing operations of FIGS. 7 and 8.

FIG. 9 is a diagram for describing operations of FIGS. 7 and 8. The descriptions repeated with FIGS. 2A and 5 will be omitted.

Referring to FIG. 9, a multi-core processing device 16 may include first, second, third and fourth processor cores 216, 226, 236 and 246, a cache memory 300a, a main memory device 400, a cache budget scheduler 506 and a monitoring logic 606. For example, the cache budget scheduler 506 and the monitoring logic 606 may include circuitry such as transistors, capacitors, logic gates, and other circuit elements to implement certain functionality described herein.

The first to fourth processor cores 216 to 246 may receive and execute first, second, third and fourth tasks 116, 126, 136 and 146. For example, the first task 116 may be allocated to the first processor core 216, the second task 126 may be allocated to the third processor core 236, the third task 136 may be allocated to the second processor core 226, and the fourth task 146 may be allocated to the fourth processor core 246.

The monitoring logic 606 may include a priority detection logic 616. The priority detection logic 616 may monitor the first to fourth tasks 116 to 146 and communicate with the first to fourth processor cores 216 to 246, and may detect first, second, third and fourth priorities PR1, PR2, PR3 and PR4 of the first to fourth tasks 116 to 146. For example, the priority detection logic 616 may detect the first priority PR1 of the first task 116, the second priority PR2 of the second task 126, the third priority PR3 of the third task 136 and the fourth priority PR4 of the fourth task 146.

The cache budget scheduler 506 may receive first, second, third and fourth characteristic information CI1, CI2, CI3 and CI4 associated with the first to fourth tasks 116 to 146, and may receive the first to fourth priorities PR1 to PR4 of the first to fourth tasks 116 to 146 from the priority detection logic 616.

The cache budget scheduler 506 may control and/or adjust a present usage of the cache memory 300a in real time using the first to fourth characteristic information CI1 to CI4 and the first to fourth priorities PR1 to PR4 together.

For example, the cache budget scheduler 506 may set first, second and third cache areas 316, 326, 336 and 346 on the cache memory 300a. The cache budget scheduler 506 may allocate the first cache area 316 to the first processor core 216, may allocate the second cache area 326 to the third processor core 236, may allocate the third cache area 336 to the second processor core 226, and may allocate the fourth cache area 346 to the fourth processor core 236.

For example, the first priority PR1 of the first task 116 may be the highest priority among the first to fourth priorities PR1 to PR4, and thus the first cache area 316 allocated to the first processor core 216 performing the first task 116 may have the largest size among the cache areas 316 to 346. The third priority PR3 of the third task 136 may be lower than the first priority PR1 of the first task 116, and thus a size of the second cache area 326 allocated to the second processor core 226 performing the third task 136 may be smaller than the size of the first cache area 316. The second priority PR2 of the second task 126 may be lower than the third priority PR3 of the third task 136, and thus a size of the third cache area 336 allocated to the third processor core 236 performing the second task 126 may be smaller than the size of the second cache area 326. The fourth priority PR4 of the fourth task 146 may be the lowest priority among the first to fourth priorities PR1 to PR4, and thus the fourth cache area 346 allocated to the fourth processor core 246 performing the fourth task 146 may have the smallest size among the cache areas 316 to 346. For example, as described with reference to FIG. 5, the first task 116 and the third task 136 may have the first attribute CRT1, the second task 126 may have the second attribute CRT2, and the fourth task 146 may have the third attribute CRT3.

In some example embodiments, a grouping operation similar to operation S312 in FIG. 4 may be additionally performed. In this example, processor cores to which tasks having the same or similar attribute are allocated may be set to one processor core group, and one cache area may be allocated to one processor core group.

Figure 10:
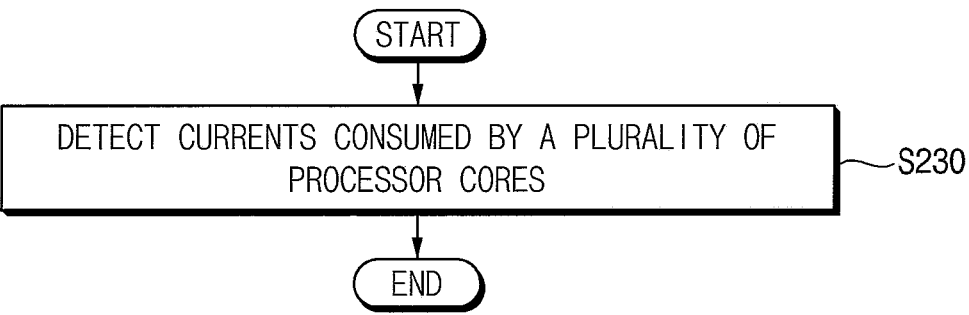
FIG. 10 is a flowchart illustrating still another example of monitoring a task execution environment in FIG. 1.

FIG. 10 is a flowchart illustrating still another example of monitoring a task execution environment in FIG. 1.

Referring to FIGS. 1 and 10, when monitoring the task execution environment while the plurality of processor cores perform the plurality of tasks (operation S200), currents (e.g., power) consumed by the plurality of processor cores may be detected (operation S230).

Figure 11:
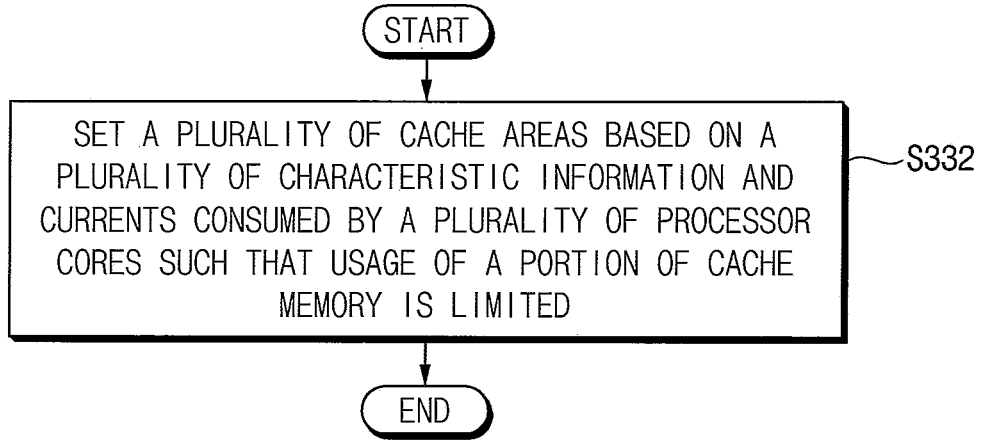
FIG. 11 is a flowchart illustrating still another example of allocating a plurality of cache areas to a plurality of processor cores in FIG. 1.

FIG. 11 is a flowchart illustrating still another example of allocating a plurality of cache areas to a plurality of processor cores in FIG. 1.

Referring to FIGS. 1 and 11, when allocating the plurality of cache areas to the plurality of processor cores based on the plurality of characteristic information and the task execution environment (operation S300), the plurality of cache areas may be set based on the plurality of characteristic information and the currents consumed by the plurality of processor cores such that a usage of a portion of the at least one cache memory is limited or restricted (operation S332).

Figure 12:
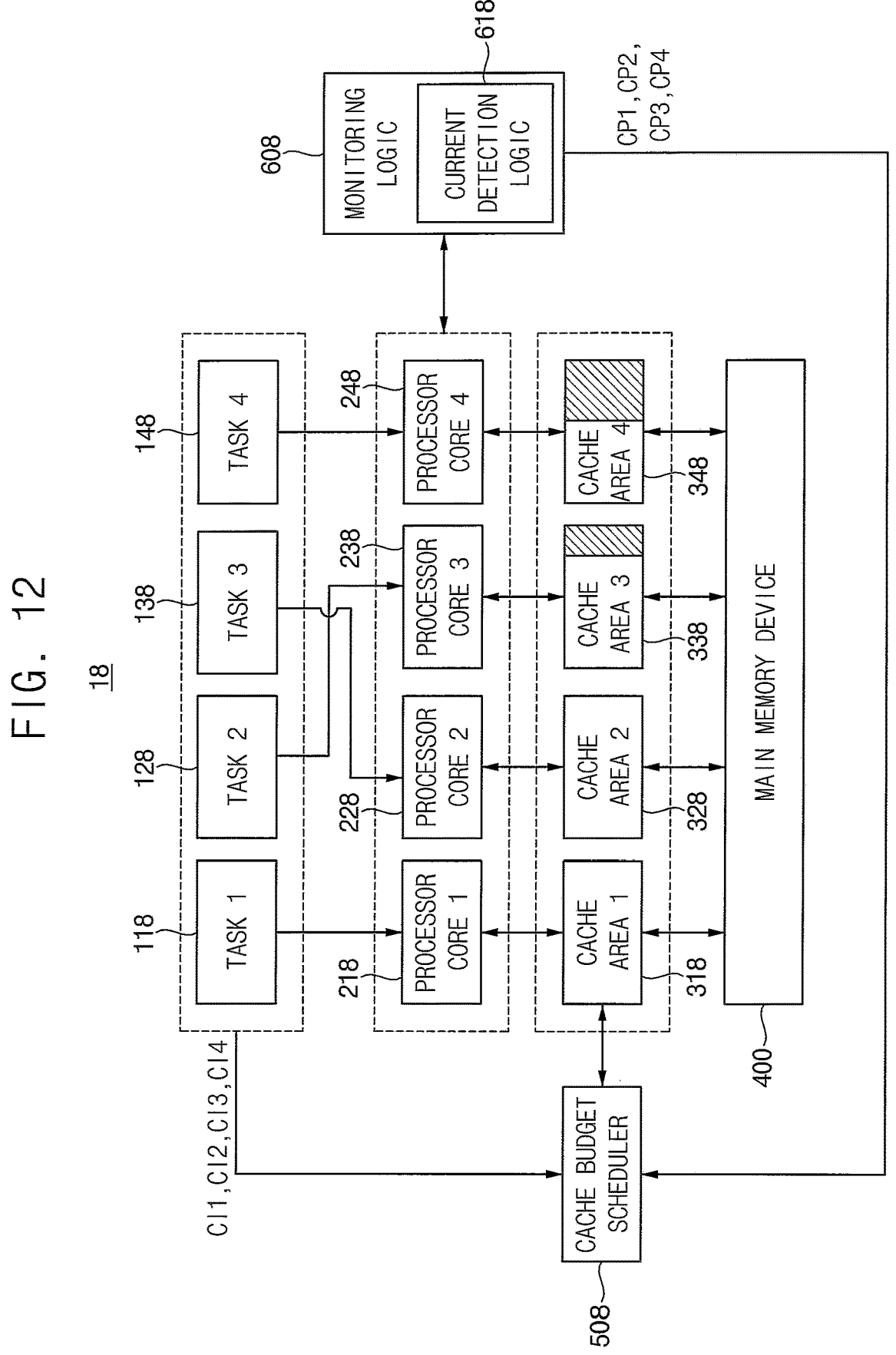
FIG. 12 is a diagram for describing operations of FIGS. 10 and 11.

FIG. 12 is a diagram for describing operations of FIGS. 10 and 11. The descriptions repeated with FIG. 2B will be omitted.

Referring to FIG. 12, a multi-core processing device 18 may include first, second, third and fourth processor cores 218, 228, 238, 248, first, second, third and fourth cache memories 318, 328, 338 and 348, a main memory device 400, a cache budget scheduler 508 and a monitoring logic 608. The multi-core processing device 18 of FIG. 12 may have a private cache structure in which the first to fourth cache memories 318 to 348 correspond to the first to fourth processor cores 218 to 248, respectively. For example, the cache budget scheduler 508 and the monitoring logic 608 may include circuitry such as transistors, capacitors, logic gates, and other circuit elements to implement certain functionality described herein.

The first to fourth processor cores 218 to 248 may receive and execute first, second, third and fourth tasks 118, 128, 138 and 148. For example, the first task 118 may be allocated to the first processor core 218, the second task 128 may be allocated to the third processor core 238, the third task 138 may be allocated to the second processor core 228, and the fourth task 148 may be allocated to the fourth processor core 248.

The monitoring logic 608 may include a current detection logic 618. The current detection logic 618 may communicate with the first to fourth processor cores 218 to 248, and may detect first to fourth currents CP1, CP2, CP3 and CP4 consumed by the first to fourth processor cores 218 to 248. For example, the current detection logic 618 may detect the first current CP1 consumed by the first processor core 218, the second current CP2 consumed by the second processor core 228, the third current CP3 consumed by the third processor core 238, and the fourth current CP4 consumed by the fourth processor core 248.

The cache budget scheduler 508 may receive first, second, third and fourth characteristic information CI1, CI2, CI3 and CI4 associated with the first to fourth tasks 118 to 148, and may receive the first to fourth currents CP1 to CP4 consumed by the first to fourth processor cores 218 to 248 from the current detection logic 618.

The cache budget scheduler 508 may control and/or adjust present usages of the first to fourth cache memories 318 to 348 in real time using the first to fourth characteristic information CI1 to CI4 and the first to fourth currents CP1 to CP4 consumed by the first to fourth processor cores 218 to 248 together.

For example, the cache budget scheduler 508 may set first, second, third and fourth cache areas on the first to fourth cache memories 318 to 348, respectively. For example, each cache area may be a portion or all of a corresponding cache memory, and each cache area may be set or determined such that a usage of a portion of the corresponding cache memory by each processor core is limited based on a current consumed by each processor core.

For example, the first current CP1 consumed by the first processor core 218 and the second current CP2 consumed by the second processor core 228 may be less than a first reference current, and thus the first cache area and the second cache area may be set on all of the first cache memory 318 and all of the second cache memory 328, respectively. The third current CP3 consumed by the third processor core 238 may be larger than or equal to the first reference current and less than a second reference current larger than the first reference current, and thus the third cache area may be set on a first portion of the third cache memory 338. The fourth current CP4 consumed by the fourth processor core 248 may be larger than or equal to the second reference current, and thus the fourth cache area may be set on a second portion of the fourth cache memory 348. Portions where the usage is limited are hatched in the third cache memory 338 and the fourth cache memory 348, and a size of the first portion in the third cache memory 338 may be larger than a size of the second portion in the fourth cache memory 348. For example, as described with reference to FIG. 5, the first task 118 and the third task 138 may have the first attribute CRT1, the second task 128 may have the second attribute CRT2, and the fourth task 148 may have the third attribute CRT3.

As described above, the usage of the cache may be partially limited. Thus, static power and dynamic power, which are two elements related to current consumption, may be reduced, and heat generation may be reduced.

Although example embodiments are described by monitoring and/or detecting the memory access patterns, the priorities and the consumed currents, and by setting and allocating the cache memory based thereon, example embodiments are not limited thereto, and the cache memory may be set and allocated by monitoring and/or detecting various other information. For example, an operating temperature of the plurality of processor cores may be monitored and/or detected. In this regard, the monitoring logic 600 may include a temperature sensor detecting the operating temperature. In this example, when the operating temperature is higher than a reference temperature, each cache area may be set such that a usage of a portion of the corresponding cache memory is limited.

In addition, although example embodiments are described by monitoring and/or detecting only one of the memory access patterns, the priorities and the consumed currents, and by setting and allocating the cache memory based thereon, example embodiments are not limited thereto. For example, two or more of the memory access patterns, the priorities and the consumed currents may be monitored and/or detected, and the cache memory may be set and allocated based thereon.

FIG. 13 is a flowchart illustrating a method of scheduling cache budget in a multi-core processing device according to example embodiments. The descriptions repeated with FIG. 1 will be omitted.

Referring to FIG. 13, in a method of scheduling cache budget in a multi-core processing device according to example embodiments, the plurality of tasks are received (operation S500), and the plurality of tasks are allocated to the plurality of processor cores (operation S600).

Operation S600 may be implemented in various manners according to example embodiments. For example, received tasks may be sequentially allocated to idle processor cores that do not perform tasks presently. For another example, when a specific task is received, a present task may be stopped and the specific task may be preferentially allocated. Alternatively, a received task may be allocated to an optimal processor core in consideration of operating frequencies and power consumption of the processor cores.

Operations S100, S200 and S300 in FIG. 13 may be substantially similar to operations S100, S200 and S300 in FIG. 1, respectively.

Figure 14A:
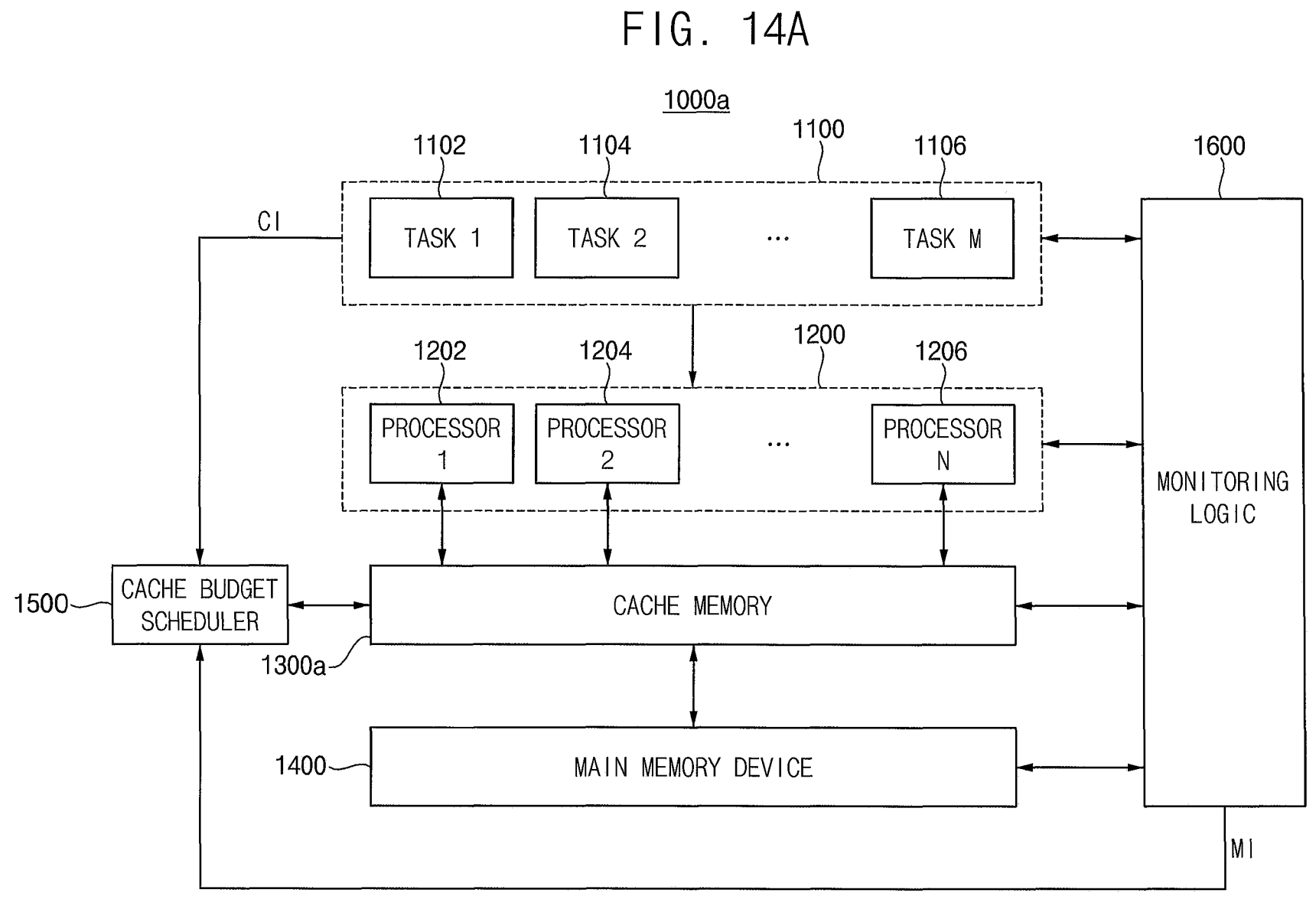
Figure 14B:
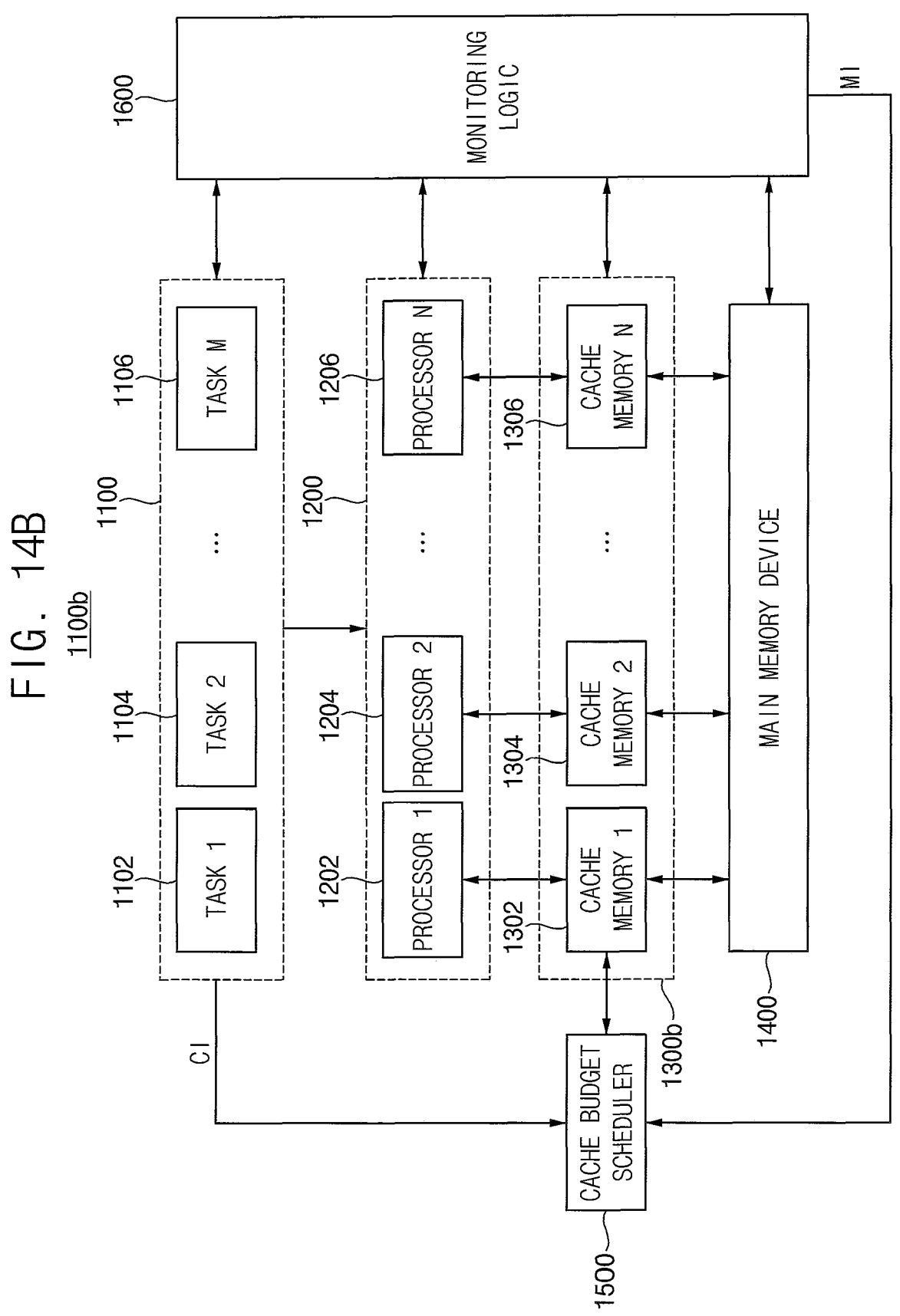

FIGS. 14A and 14B are block diagrams illustrating a multi-processor system according to example embodiments. The descriptions repeated with FIGS. 2A and 2B will be omitted.

Referring to FIG. 14A, a multi-processor system 1000a includes a plurality of processors 1200 that receive and execute a plurality of tasks 1100, a cache memory 1300a, a cache budget scheduler 1500 and a monitoring logic 1600. The multi-processor system 1000a may further include a main memory device 1400. For example, the cache budget scheduler 1500 and the monitoring logic 1600 may include circuitry such as transistors, capacitors, logic gates, and other circuit elements to implement certain functionality described herein.

Referring to FIG. 14B, a multi-processor system 1000b includes a plurality of processors 1200 that receive and execute a plurality of tasks 1100, a plurality of cache memories 1300b, a cache budget scheduler 1500 and a monitoring logic 1600. The multi-processor system 1000b may further include a main memory device 1400.

For example, the plurality of tasks 1100 may include first to M-th tasks 1102, 1104 and 1106. The plurality of processors 1200 may include first to N-th processors 1202, 1204 1206. The plurality of cache memories 1300b may include first to N-th cache memories 1302, 1304 and 1306. Each processor may include one or more processor cores.

The multi-processor system 1000a of FIG. 14A and the multi-processor system 1000b of FIG. 14B may be substantially similar to the multi-core processing device 10a of FIG. 2A and the multi-core processing device 10b of FIG. 2B, respectively, except that the plurality of processor cores 200 are replaced with the plurality of processors 1200. The plurality of tasks 1100, the plurality of processors 1200, the plurality of cache memories 1300a and 1300b, the main memory device 1400, the cache budget scheduler 1500 and the monitoring logic 1600 in FIGS. 14A and 14B may be substantially similar to the plurality of tasks 100, the plurality of processor cores 200, the plurality of cache memories 300a and 300b, the main memory device 400, the cache budget scheduler 500 and the monitoring logic 600 in FIGS. 2A and 2B, respectively, and may operate according to example embodiments. In this example, the method of scheduling cache budget in the multi-core processing device according to example embodiments may be described as a method of scheduling cache budget in a multi-processor system.

As will be appreciated by those skilled in the art, the present disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

18

Figure 15:
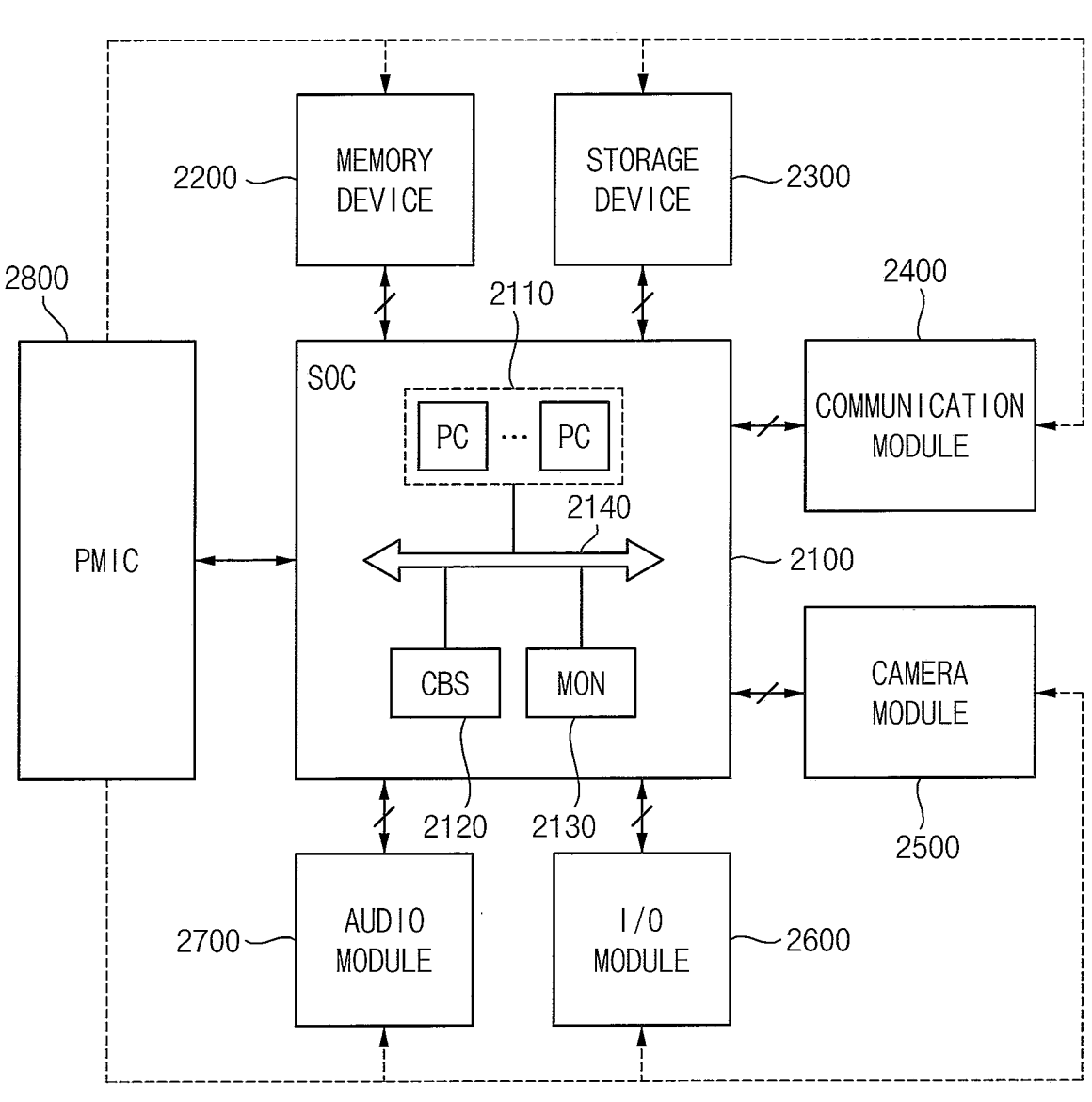
FIG. 15 is a block diagram illustrating an electronic device according to example embodiments.

FIG. 15 is a block diagram illustrating an electronic device according to example embodiments.

Referring to FIG. 15, an electronic device 2000 may include a system on chip (SOC) 2100, a memory device 2200, a storage device 2300, a plurality of functional modules 2400, 2500, 2600 and 2700, and a power management integrated circuit (PMIC) 2800.

The system on chip 2100 controls overall operations of the electronic device 2000. For example, the system on chip 2100 may control the memory device 2200, the storage device 2300 and the plurality of functional modules 2400, 2500, 2600 and 2700. For example, the system on chip 2100 may be an application processor.

The system on chip 2100 may include a plurality of processor cores (PCs) 2110, a cache budget scheduler (CBS) 2120, a monitoring logic (MON) 2130 and a system bus 2140.

The system on chip 2100 may be the multi-core processing device according to example embodiments, and may be implemented and operate as described with reference to FIGS. 1 through 13. The plurality of cache areas may be adaptively and/or dynamically set and allocated by the cache budget scheduler 2120 and the monitoring logic (MON) 2130 in consideration of various criteria or conditions such as the memory access patterns, the priorities, the consumed currents, and/or the like. Accordingly, in the system on chip 2100, disadvantages caused by competition between processor cores may be reduced or minimized, victims of the cache memory may be reduced or minimized, and a hit ratio of the cache memory may be increased. As a result, the system on chip 2100 may have improved or enhanced performance.

The memory device 2200 and the storage device 2300 may store data for operations of the electronic device 2000. The memory device 2200 may include a volatile memory device, such as a dynamic random access memory (DRAM), a static random access memory (SRAM), a mobile DRAM, or the like. The storage device 2300 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like. In some example embodiments, the storage device 2300 may further include an embedded multimedia card (eMMC), a universal flash storage (UFS), a solid state drive (SSD), a hard disk drive (HDD), a CD-ROM, etc.

The functional modules 2400, 2500, 2600 and 2700 may perform various functions of the electronic device 2000. For example, the functional modules 2400, 2500, 2600 and 2700 may be hardware modules, and may include transistors, capacitors, logic gates, and other circuit elements to implement certain functionality described herein. For example, the electronic device 2000 may include a communication module 2400 that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, or the like), a camera module 2500 that performs a camera function, an input-output (I/O) module 2600 including a display module that performs a display function and a touch panel module that performs a touch sensing function, and an audio module 2700 including a microphone (MIC) module, a speaker module, or the like, that performs input-output of audio signals. In some example embodiments, the electronic device 2000 may further include a global positioning system (GPS) module, a gyroscope module, or the like. However, the functional modules 2400, 2500, 2600 and 2700 in the electronic device 2000 are not limited thereto.

The power management integrated circuit 2800 may provide an operating voltage to the system on chip 2100, the memory device 2200, the storage device 2300 and the functional modules 2400, 2500, 2600 and 2700.

Example embodiments may be applied to various electronic devices and systems that include the multi-core processing devices and/or the multi-processor systems. For example, example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although aspects of some example embodiments have been described, those skilled in the art will readily appreciate that many modifications are possible without materially departing from the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method comprising:
receiving a plurality of characteristic information associated with a plurality of tasks allocated to a plurality of processor cores;
monitoring a task execution environment while the plurality of processor cores perform the plurality of tasks based on at least one operating condition, wherein the monitoring comprises identifying a first priority of a first task allocated to a first processor core as higher than a second priority of a second task allocated to a second processor core; and
allocating a plurality of cache areas of at least one cache memory to the plurality of processor cores based on the plurality of characteristic information and the task execution environment, wherein the allocating comprises setting a first size of a first cache area corresponding to the first processor core based on the first priority of the first task, setting a second size of a second cache area corresponding to the second processor core based on the second priority of the second task, allocating, to the first processor core, the first cache area of the first size set according to the first priority, and allocating, to the second processor core, the second cache area of the second size set according to the second priority,
wherein sizes of the plurality of cache areas are set differently for the plurality of processor cores.

20

2. The method of claim 1, wherein the monitoring the task execution environment comprises detecting memory access patterns of the plurality of processor cores.

3. The method of claim 2, wherein the allocating the plurality of cache areas to the plurality of processor cores comprises:
classifying the plurality of processor cores into a plurality of processor core groups based on the plurality of characteristic information and the memory access patterns of the plurality of processor cores;
setting the plurality of cache areas based on the plurality of characteristic information and the memory access patterns of the plurality of processor cores; and
allocating the plurality of cache areas to the plurality of processor core groups.

4. The method of claim 3, wherein the at least one cache memory comprises a first cache memory shared by the plurality of processor cores, and
wherein the first cache memory comprises each of the plurality of cache areas.

5. The method of claim 3, wherein the classifying comprises classifying a third processor core and a fourth processor core in a first processor core group based on a third task allocated to the third processor core and a fourth task allocated to the fourth processor core having a first attribute.

6. The method of claim 3, wherein the classifying comprises classifying a third processor core and a fourth processor core in a first processor core group based on a third task allocated to the third processor core and a fourth task allocated to the fourth processor core operating using a first resource.

7. The method of claim 3, wherein the setting comprises setting the first size of the first cache area allocated to a first processor core group to be larger than the second size of the second cache area allocated to a second processor core group based on a first number of memory accesses of the first processor core group being greater than a second number of memory accesses of the second processor core group.

8. The method of claim 1, wherein the monitoring the task execution environment comprises detecting priorities of the plurality of tasks.

9. The method of claim 8, wherein the allocating the plurality of cache areas to the plurality of processor cores comprises:
setting the plurality of cache areas based on the plurality of characteristic information and the priorities of the plurality of tasks; and
allocating the plurality of cache areas to the plurality of processor cores, and
wherein the setting comprises setting the first size of the first cache area allocated to the first processor core to be larger than the second size of the second cache area allocated to the second processor core.

10. The method of claim 9, wherein the first size of the first cache area allocated to the first processor core is set to be larger than the second size of the second cache area allocated to the second processor core.

11. The method of claim 1, wherein the monitoring the task execution environment comprises detecting currents consumed by the plurality of processor cores.

12. The method of claim 11, further comprising limiting a usage of a portion of the at least one cache memory based on the currents consumed by the plurality of processor cores.

13. The method of claim 12, wherein the at least one cache memory comprises a plurality of cache memories that are used by the plurality of processor cores, respectively, and wherein the plurality of cache memories comprises each of the plurality of cache areas.

14. The method of claim 12, wherein the limiting comprises limiting a third cache area allocated to a third processor core based on a first current consumed by the first processor core being larger than a reference current.

15. The method of claim 1, further comprising:

receiving the plurality of tasks; and allocating the plurality of tasks to the plurality of processor cores.

16. A multi-core processing device comprising:

a plurality of processor cores configured to receive and perform a plurality of tasks, each of the plurality of tasks being allocated to one of the plurality of processor cores;

at least one cache memory communicably coupled to the plurality of processor cores, and comprising a plurality of cache areas;

monitoring logic circuitry configured to monitor a task execution environment while the plurality of processor cores perform the plurality of tasks based on at least one operating condition, and identify a first priority of a first task allocated to a first processor core as higher than a second priority of a second task allocated to a second processor core; and cache budget scheduling circuitry configured to receive a plurality of characteristic information associated with the plurality of tasks and a result of monitoring the task execution environment, set the plurality of cache areas based on the plurality of characteristic information and the task execution environment, set a first size of a first cache area corresponding to the first processor core based on the first priority of the first task, set a second size of a second cache area corresponding to the second processor core based on the second priority of the second task the second task, allocate, to the first processor core, the first cache area of the first size set according to the first priority, and allocate, to the second processor core, the second cache area of the second size set according to the second priority, wherein sizes of the plurality of cache areas are set differently for the plurality of processor cores.

17. The multi-core processing device of claim 16, wherein the monitoring logic circuitry comprises:

memory access detection logic circuitry configured to detect memory access patterns of the plurality of processor cores for performing the plurality of tasks, and wherein the cache budget scheduling circuitry is further configured to classify the plurality of processor cores into a plurality of processor core groups based on the plurality of characteristic information and the memory access patterns of the plurality of processor cores, set the plurality of cache areas based on the plurality of characteristic information and the memory access patterns of the plurality of processor cores, and allocate the plurality of cache areas to the plurality of processor core groups.

18. The multi-core processing device of claim 16, wherein the monitoring logic circuitry comprises priority detection logic circuitry configured to detect priorities of the plurality of tasks, and wherein the cache budget scheduling circuitry is further configured to set the plurality of cache areas based on the plurality of characteristic information and the priorities of the plurality of tasks, and allocate each of the plurality of cache areas to one of the plurality of processor cores.

19. The multi-core processing device of claim 16, wherein the monitoring logic circuitry comprises current detection logic circuitry configured to detect currents consumed by the plurality of processor cores, and wherein the cache budget scheduling circuitry is further configured to set the plurality of cache areas based on the plurality of characteristic information and the currents consumed by the plurality of processor cores by limiting a usable portion of the at least one cache memory.

20. A method comprising:

receiving a plurality of tasks;

allocating the plurality of tasks to a plurality of processor cores;

receiving a plurality of characteristic information associated with the plurality of tasks;

detecting memory access patterns of the plurality of processor cores while the plurality of processor cores perform the plurality of tasks;

classifying the plurality of processor cores into a plurality of processor core groups based on the plurality of characteristic information and the memory access patterns;

setting a plurality of cache areas on a cache memory based on the plurality of characteristic information and the memory access patterns, wherein sizes of the plurality of cache areas are set to be different from each other; and allocating the plurality of cache areas to the plurality of processor core groups such that processor cores included in a same processor core group are allocated to a same cache area, and processor cores to which tasks having a same attribute are allocated are included in the same processor core group, or processor cores to which tasks operating using a same resource are allocated are included in the same processor core group, wherein the setting comprises increasing a size of a cache area allocated to a processor core group, among the plurality of processor core groups, as a number of memory accesses of the processor core group increases.

* * * * *